(12) United States Patent
Gindele

(10) Patent No.: US 7,113,649 B2
(45) Date of Patent: Sep. 26, 2006

(54) ENHANCING THE TONAL CHARACTERISTICS OF DIGITAL IMAGES

(75) Inventor: Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 771 days.

(21) Appl. No.: 10/178,260

(22) Filed: Jun. 24, 2002

(65) Prior Publication Data

US 2003/0235342 A1    Dec. 25, 2003

(51) Int. Cl.
*G06K 9/40* (2006.01)
(52) U.S. Cl. ....................................... 382/274
(58) Field of Classification Search ................. 382/274
See application file for complete search history.

(56) References Cited

U.S. PATENT DOCUMENTS

| | | | |
|---|---|---|---|
| 4,731,671 A | | 3/1988 | Alkofer |
| 4,745,465 A | | 5/1988 | Kwon |
| 5,121,198 A | | 6/1992 | Maronian et al. |
| 5,300,381 A | * | 4/1994 | Buhr et al. ................... 430/30 |
| 5,541,028 A | * | 7/1996 | Lee et al. ..................... 430/30 |
| 5,854,851 A | * | 12/1998 | Bamberger et al. ......... 382/132 |
| 5,946,407 A | | 8/1999 | Bamberger et al. |
| 6,282,311 B1 | | 8/2001 | McCarthy et al. |
| 6,285,798 B1 | | 9/2001 | Lee |
| 6,317,521 B1 | | 11/2001 | Gallagher et al. |
| 6,753,987 B1 | * | 6/2004 | Farnung et al. ............. 358/518 |

FOREIGN PATENT DOCUMENTS

| | | |
|---|---|---|
| EP | 0377386 | 7/1990 |
| EP | 0691627 | 1/1996 |
| EP | 0949807 | 10/1999 |
| WO | WO 01/39104 | 5/2001 |

* cited by examiner

*Primary Examiner*—Bhavesh M. Mehta
*Assistant Examiner*—Wes Tucker
(74) *Attorney, Agent, or Firm*—Raymond L. Owens

(57) ABSTRACT

A method of producing a tone scale function which can operate on a source digital image to improve tonal characteristics, includes generating the tone scale function having a highlight tone scale segment and a shadow tone scale segment defined relative to a reference point on the tone scale function, and that is adapted to operate on the source digital image to improve its tonal characteristics by: using a first function with a monotonically decreasing slope characteristic to produce the highlight tone scale segment that includes points that are equal to or greater than the reference point; and using a second function with a monotonically increasing slope characteristic to produce the shadow tone scale segment that includes points that are equal to or less than the reference point.

18 Claims, 22 Drawing Sheets

ENHANCING THE TONAL CHARACTERISTICS OF DIGITAL IMAGES

FIELD OF THE INVENTION

This invention relates to digital image processing and in particular to processing a digital image to enhance its color, brightness, and tone scale characteristics.

BACKGROUND OF THE INVENTION

Many digital imaging systems enhance the contrast and lightness characteristics of digital images through the application of a tone scale curve. For a generalized tone scale curve $f(\ )$, the input pixel value x is transformed to an output pixel value $f(x)$. The shape of the tone scale curve determines the visual effect imparted to the processed digital image. Some tone scale curves applied to digital image are independent of the pixel values in the digital image to be processed. Such image independent tone scale curves are useful for establishing a photographic look to the processed digital images. While image independent tone scale curves can be used to enhance many digital images, digital images that are either too high or low in contrast can benefit from the application of a tone scale curve that is responsive to the distribution of pixel values in the digital image to be processed. For image dependent tone scale curves, the mathematical formula used to generate the function $f(x)$ determines the degree and nature of the image enhancement.

One class of tone scale function generation methods is derived from histogram equalization. A histogram function $H(x)$, i.e. a function of the frequency of occurrence, is calculated from the pixel values x of a digital image. Next the function $f(x)$ is determined for which the histogram function of the processed pixels $H(f(x))$ will have a particular aim functional $W(x)$. The function $f(x)$ that satisfies this constraint can be calculated given the expression $f(x)=kC(W^{-1}(H(x)))$ where the variable k is a normalizing constant. For the special case where the aim functional $W(x)$ is a constant, the expression for the tone scale curve $f(x)$ is given by the expression $f(x)=kC(H(x))$.

There are many prior art examples of histogram equalization based methods: In commonly-assigned U.S. Pat. No. 4,731,671 Alkofer discloses a method of using a Gaussian function as the aim function $W(x)$. In commonly-assigned U.S. Pat. No. 4,745,465 Kwon discloses a method of generating a tone scale curve also employing a histogram equalization derived method wherein a Gaussian function is used as the aim function $W(x)$. In Kwon's method, the image histogram is calculated by sampling pixels within the image that have been classified as spatially active. An edge detection spatial filter is used to determine the degree of local spatial activity for each image pixel. The local spatial activity measure is compared with a threshold to determine if the pixel value will contribute to the histogram function used to generate the tone scale curve. As with less sophisticated histogram equalization based methods, the methods disclosed by Alkofer and Kwon suffer from inconsistent image enhancement performance. This is principally due to the fact that histogram equalization methods tend to optimize the visualization of image content based on the frequency of occurrence of the corresponding pixel values. As a consequence, extremely bright or dark image areas that are represented by a small percentage of image area can be overwhelmed by more prevalent image areas resulting in tone scale adjusted images that have specular highlights that are rendered too dark and deep shadows that are rendered too light. Therefore, histogram equalization based methods are more suited to image exploitation applications requiring the visualization of image detail than to applications involving the tone reproduction of natural scenes.

In commonly-assigned U.S. Pat. No. 6,285,798 Lee discloses a method of generating a tone scale curve for the purposes of reducing the dynamic range of a digital image. The tone scale curve construction method establishes six constraints and then performs a successive integration procedure to satisfy the constraints. In Lee's method, a dark point determined by the 0.5% image cumulative histogram function value is mapped to a white paper density, a bright point determined by the 99.5% image cumulative histogram function value is mapped to a black paper density, and a mid-point is mapped to itself. Next a shadow slope constraint of greater than 1.0 is imposed at the 0.5% shadow point, a highlight slope constraint of 1.0 is imposed at the 99.5% highlight point, and a mid-tone slope constraint of 1.0 is imposed at the mid-point. Lee states that there are an infinite number of tone scale curves that can satisfy the six constraints. Lee's method constructs a tone scale curve that satisfies the six constraints by assuming an arbitrary initial shape for the tone scale curve and successively convolving the tone scale curve with a Gaussian smoothing function until, upon examination, the tone scale curve satisfies the six constraints to within some acceptable tolerance. Lee's method does not discuss a closed form solution, i.e. a mathematical function that can be evaluated for each point, to the six constraints and therefore must rely the complicated integration procedure. The tone scale curves so constructed are smoothly varying achieving a high slope value at the extremes and at the mid-point with an inflection point between the mid-point ant the highlight point and an inflection point between the mid-point and the shadow point. While Lee's method disclosed in commonly-assigned U.S. Pat. No. 6,285,798 can produce smoothly varying tone scale curves, the method does not always converge to a curve that satisfies the six constraints. Furthermore, the Lee's method does not account for the possibility that some digital images require an expansion of the dynamic range of the digital image to achieve enhancement. In addition, the high slope constraints imposed at the extremes and at the mid point of the pixel intensity domain can sometimes lead to a sacrifice of quality for image content corresponding to pixel values that lie between the shadow point and the mid-point, and the mid-point and the highlight point.

In the journal article entitled "Image lightness rescaling using sigmoidal contrast enhancement functions" published in the Journal of Electronic Images Vol. 8(4), p380–393 (October 1999), authors Braun et al. discuss a method of using a single sigmoidal function, e.g. as the integral-of a-Gaussian function, as a method of generating a tone scale curve that can be used for contrast enhancement of digital images. The sigmoidal function presented by Braun et al. is controlled with a standard deviation and offset parameter which determine the shape of the function. The offset parameter is used to impart lightness changes to digital images while the standard deviation parameter is used to impart contrast changes. While the sigmoidal shaped tone scale curve generation method presented by Braun et al. provides photographically acceptable results, the shape of the function corresponding to shadow and highlight regions of images is not independently controllable. Consequently, for a given digital image, it can be difficult to achieve the desired degree of contrast enhancement while simultaneously achieving the optimum image lightness rendition.

SUMMARY OF THE INVENTION

It is an object of the present invention to improve the method for generating a tone scale function that can be used to enhance the tonal characteristics of a digital image.

This object is achieved by a method of producing a tone scale function which can operate on a source digital image to improve tonal characteristics, comprising the steps of:

generating the tone scale function having a highlight tone scale segment and a shadow tone scale segment defined relative to a reference point on the tone scale function, and that is adapted to operate on the source digital image to improve its tonal characteristics by:

i) using a first function with a monotonically decreasing slope characteristic to produce the highlight tone scale segment that includes points that are equal to or greater than the reference point; and ii) using a second function with a monotonically increasing slope characteristic to produce the shadow tone scale segment that includes points that are equal to or less than the reference point.

By practicing the present invention, the characteristics of the highlight and shadow regions of the digital image are significantly enhanced.

The present invention facilitates using functions to improve the highlight and shadow regions wherein the shape of such functions are independently controllable of each other and the function employs a white point and black point mapping strategy.

The present invention recognizes that for digital images, different enhancement functions should be used for the highlight and shadow regions. These functions can either be used to both compress or expand the contrast of the different regions.

DETAILED DESCRIPTION OF THE INVENTION

In the following description, a preferred embodiment of the present invention will be described as a software program. Those skilled in the art will readily recognize that the equivalent of such software may also be constructed in hardware. Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein, may be selected from such systems, algorithms, components and elements thereof known in the art. Given the description as set forth in the following specification, all software implementation thereof as a computer program is conventional and within the ordinary skill in such arts.

Still further, as used herein, the computer program may be stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

A digital image is comprised of one or more digital image channels. Each digital image channel is comprised of a two-dimensional array of pixels. Each pixel value relates to the amount of light received by the imaging capture device corresponding to the geometrical domain of the pixel. For color imaging applications, a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications.

Although the present invention describes a digital image channel as a two-dimensional array of pixels values arranged by rows and columns, those skilled in the art will recognize that the present invention can be applied to mosaic (non-rectilinear) arrays with equal effect.

Figure 1:
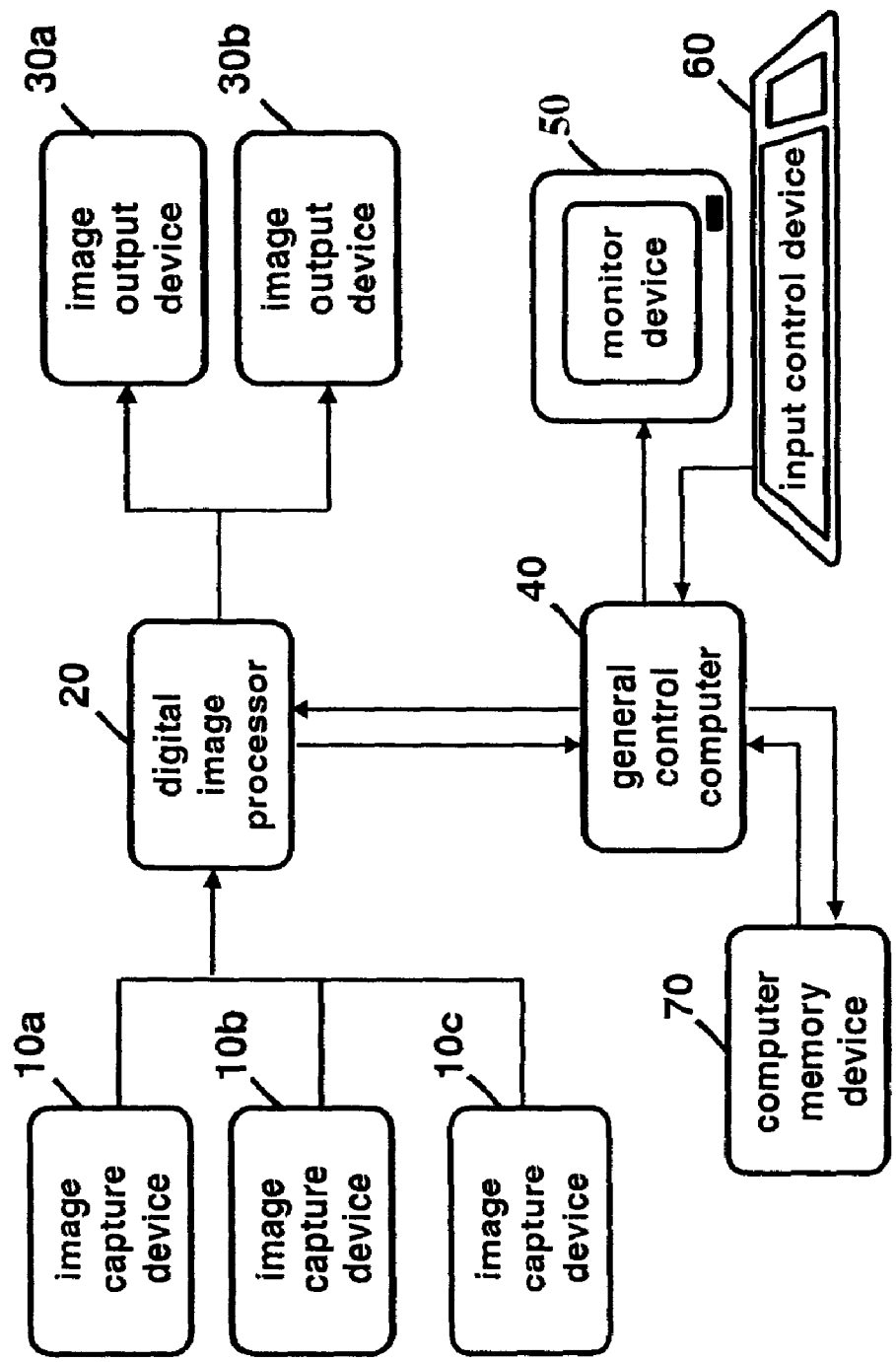
FIG. 1 is a functional block diagram showing the component parts of a system implementation of the present invention.

The present invention may be implemented in computer hardware. Referring to FIG. 1, the following description relates to a digital imaging system which includes an image capture device 10, a digital image processor 20, image output devices 30a and 30b, and a general control computer 40. The system may include a monitor device 50 such as a computer console or paper printer. The system may also include an input control device 60 for an operator such as a keyboard and or mouse pointer. Still further, as used herein, the present invention may be implemented as a computer program and may be stored in a computer memory device 70, i.e. a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well known computer system, such as a personal computer.

Multiple capture devices 10a, 10b, and 10c are shown illustrating that the present invention can be used for digital images derived from a variety of imaging devices. For example, FIG. 1 can represent a digital photofinishing system where the image capture device 10a may be a film scanner device which produces digital images by scanning a conventional photographic image, e.g. color negative film or slide film transparencies. Similarly, image capture device 10b could be a digital camera. The digital image processor 20 provides the means for processing the digital images to produce pleasing looking images on an intended output device or media. Multiple image output devices 30a and 30b are shown illustrating that the present invention may be used in conjunction with a variety of output devices which may include a digital photographic printer and soft copy display. It should also be noted that the present invention can be implemented within the hardware and software of a digital camera such that the digital images produced by the digital camera have been processed with the present invention prior to being exported by the digital camera.

Figure 2:
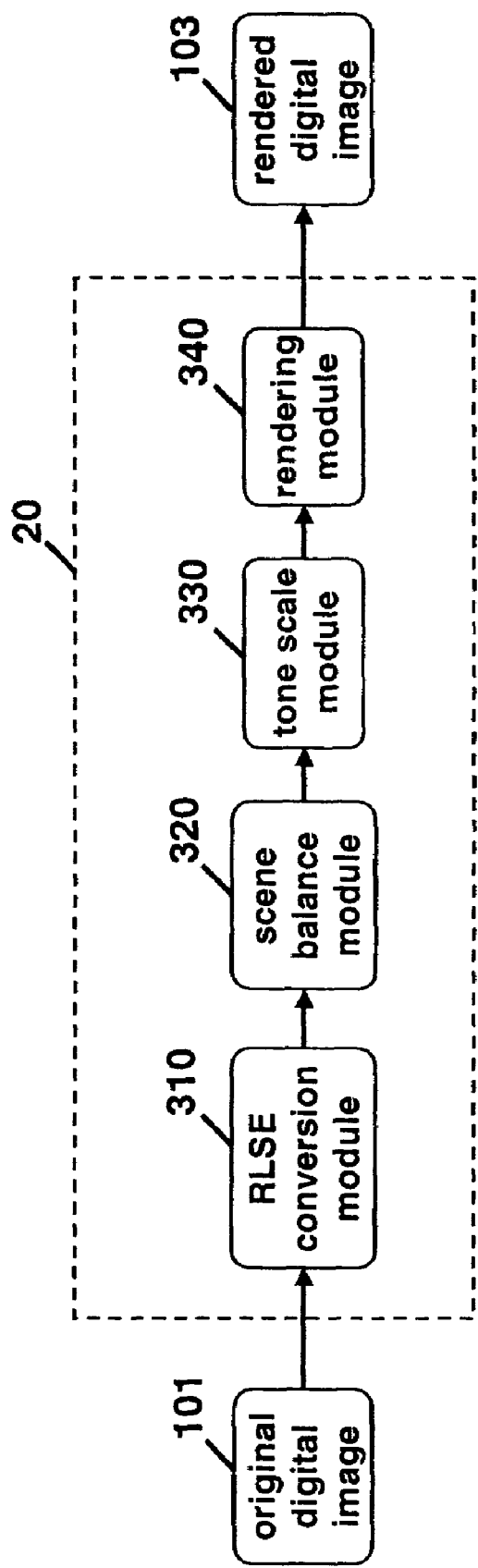
FIG. 2 is a functional block diagram of the digital image processor.

The digital image processor 20 depicted in FIG. 1 is illustrated in more detail in FIG. 2. The cascaded image processing modules shown in FIG. 2 represents a digital image processing path. The original digital image 101 is received from one of the image input devices shown in FIG. 1 and processed to produce a rendered digital image 103 that can be realized on an image output device. The RLSE (relative log scene exposure) conversion module 310 receives the original digital image 101 and generates an RLSE digital image that is prepared for balancing and the application of a tone scale function. The scene balance module 320 receives the RLSE digital image and performs a lightness and color balance adjustment resulting in a source digital image. The tone scale module 330 receives the source digital image, generates a tone scale function from the source digital image and applies the tone scale function to the source digital image resulting in an enhanced digital image. If the RLSE conversion module 310 and the scene balance module 320 are omitted from the image processing path of modules, the tone scale module 330 receives the original digital image 101 directly as the source digital image. The rendering module 340 processes the enhanced digital image such that the pixel values of the generated rendered digital image 103 have been prepared to yield a pleasing result when used in conjunction with an output image device such as a digital printer. As part of the processing performed by the rendering module 340, a rendering function R(x) is applied to the pixel data of the enhanced digital image to achieve the input to output pixel mapping required of the output image device. The configuration of processing modules shown in FIG. 2 is used for processing digital images that are either monochrome or color in nature. That is, the original digital image 101 includes one or more digital image channels of pixels wherein each digital image channel relates to a different color or pixels such as, an original digital image 101 that includes red, green, and blue representation or a luminance-chrominance representation.

The tone scale functions produced by the present invention are design to work best with digital images that are in a relative log scene exposure representation (RLSE). That is, the pixels of the original digital image 101 have a logarithmic relationship with respect to the original scene intensities of light from which the original digital image 101 is derived. For example, the image capture device 10a shown in FIG. 1 can represent a photographic film scanner that produces digital images that have a linear or logarithmic relationship with the amount of transmitted light projected through a photographic negative or positive film transparency sample. If the pixels values of the resultant original digital image 101 have a logarithm relationship with the received light (i.e. the pixels are in a density representation), the original digital image 101 is considered to be in a relative log scene exposure representation. If the pixels of the original digital image 101 have a linear relationship with the received light, the original digital image 101 is considered to be in a linear exposure representation since, to within a reasonable approximation, the amount of light transmitted through the photographic film sample is linearly proportional to the amount of light received from the original photographed scene. A linear exposure representation digital image can be transformed into a relative log scene exposure representation by a linear-to-logarithmic transform implemented as function or as look-up-table (LUT) with the RLSE module 310 shown in FIG. 2.

The most common representation of digital images produced with digital cameras is a rendered representation, i.e. the digital image has been processed such that it will be yield a natural appearing image on an electronic display device. For most digital images produced with digital cameras the intended output image device is a CRT monitor device sometimes referred to as a gamma domain representation. Rendered digital images can also be transformed into a relative log scene exposure representation using a LUT transform. For digital images produced with digital cameras, the transform includes an inverse of the power law function associated with the intended electronic display device followed by an inverse rendering tone scale function related to the rendering tone scale function that the digital camera used to produce the original digital image 101. Alternatively, the method disclosed by McCarthy et al. in commonly-assigned U.S. Pat. No. 6,282,311 can be used to produce an RLSE representation from a rendered digital image.

While the best results are achieved with digital images that are in a relative log scene exposure representation, the present invention can be used to enhance the appearance of digital images that are in other representations such as linear and gamma domain representations described above. In particular, the present invention can be used to process digital images that are in a visual domain such as CIELAB.

The scene balance module 320 receives the RLSE digital image from the RLSE conversion module 310 and performs a lightness and color balance adjustment. The resulting processed digital image is called the source digital image since it is the input digital image to the tone scale module 330. The lightness adjustment to the pixel data accounts for exposure variability in the original digital image 101. The present invention can be used with any algorithm that performs a lightness adjustment, or luminance balance, of the input pixel data. In particular, the lightness balance procedure includes calculating one or more prediction features from the RLSE digital image. These predication features are combined using a linear equation of the prediction features into a single brightness balance value that relates to an estimate of the pixel value corresponding to a theoretical 18% gray scene reflector. While there are many such prediction features that are useful, the present invention uses a spatial activity measure as the most important prediction feature. An RLSE luminance-chrominance digital image is generated from the RLSE digital image. Next, a spatial activity filter is applied to the luminance pixel data of the RLSE luminance-chrominance digital image. The spatial activity filter calculates the minimum difference of adjacent pixel values within a 3 by 3 pixel region and assigns the minimum difference to the pixel. Pixels with minimum difference values that exceed a predetermined threshold are averaged to produce the first prediction feature. The second prediction feature is calculated by dividing the luminance pixels of the RLSE luminance-chrominance digital image into four strips and calculating the average the maximum pixel value from each of the four strips. Other prediction features that have proved to be useful are the average pixel value and the 90% cumulative histogram pixel value.

After the brightness balance value of the RLSE digital image has been calculated, the color cast of the RLSE digital image is calculated that can be used to remove an overall color cast. The principle causes of color casts are variation in the color of the source illumination and secondarily the color fidelity of the image sensor that recorded the original digital image. A color balance position is calculated for the RLSE digital image which represents the chrominance coordinates of a theoretical color-neutral scene reflector. The color balance position is calculated using a two dimensional Gaussian weighting surface applied to the chrominance pixel data of the RLSE luminance-chrominance digital image. Although the chrominance pixel data can be averaged in an unweighted manner, better results have been obtained using the two dimensional Gaussian weighting surface. This is principally due to the de-emphasis of highly colorful scene objects from the calculation. A balance look-up-table is calculated for each color of the RLSE digital image using the calculated color balance position and the brightness balance value. The balance look-up-table is applied to the RLSE digital image to produce the source digital image for the tone scale module 330. As a result of the application of the balance look-up-table, pixel values in the RLSE digital image that have a value equal to the predicted balance value are transformed to a value equal to a system defined reference gray point. Similarly, pixels with corresponding chrominance values that correspond to the color balance position will be transformed to a color neutral position.

The rendering module 340 accepts the enhanced digital image from the tone scale module 330 and prepares the pixel data for display on an output image device. The rendering module 340 performs a color transformation, a tonal rendering transformation, and an output encoding transformation. The pixel data must be transformed such that the pixel data representing different original scene colors are appropriate for the color spectral characteristics associated with the output image device. This can be accomplished in a multiple step procedure. First the RLSE representation pixel data of the enhanced digital image is transformed into a linear representation. Next a color matrix transform is applied to the linear representation pixel data. The color matrix can be a 3 by 3 element matrix wherein the elements of the matrix are determined by analyzing a collection of imaged color patch targets and measuring the resultant color produced with the intended output image device.

The other task includes the transformation of the pixel data from the linear or relative-log-scene-exposure representation to a rendered representation with the application of a rendering function $R(x)$. In general, the dynamic range of the enhanced digital image is much larger than can be displayed on typical output image devices such as CRT monitors or photographic paper. Therefore, if the pixel data of the enhanced digital image were received by the output image device directly, much of the pixel data would be clipped in the extreme light and dark parts of the image with a substantial loss of spatial detail. The rendering function performs a graceful roll-off of the pixel data such that the processed pixel data when displayed will result in a gradual loss of spatial detail as pixel values approach the limits of the output image device.

Figure 3A:
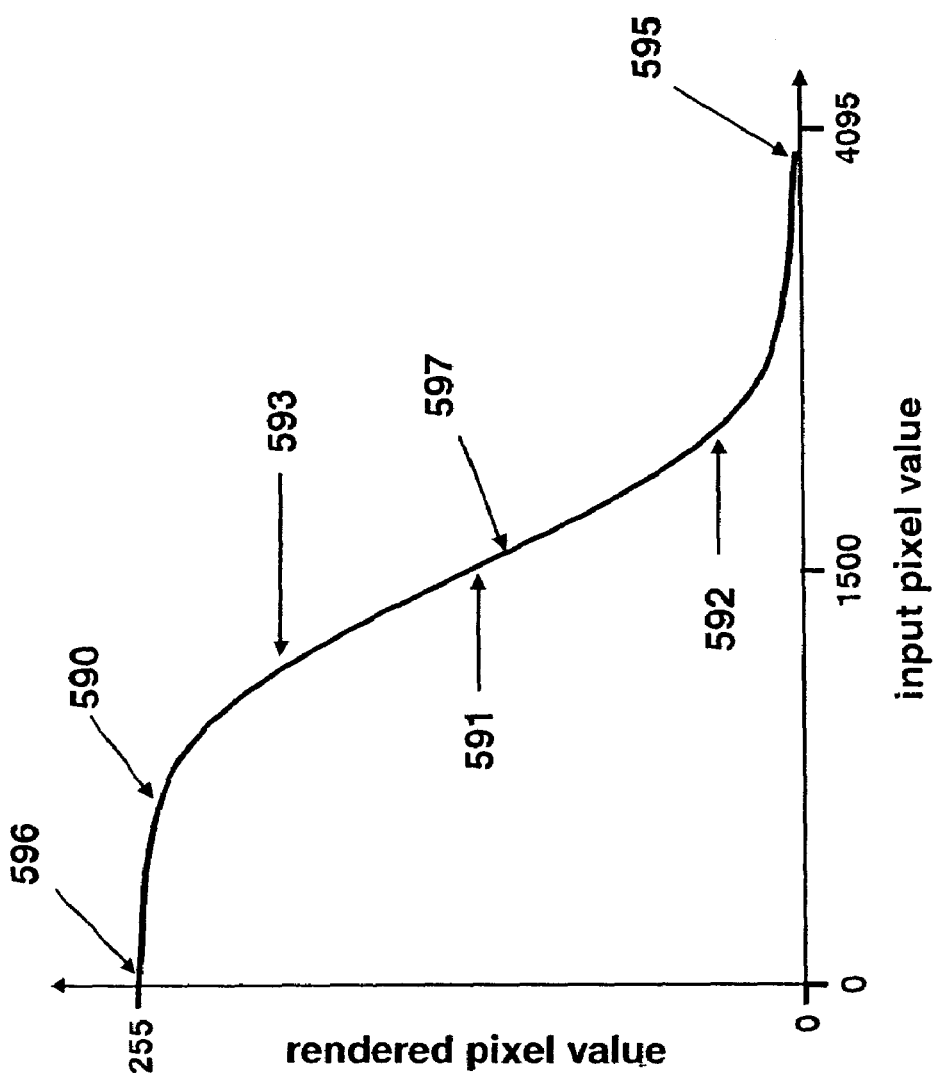
FIG. 3a is a graph of an example of a rendering function.

The present invention can be used with many different mathematical forms for the rendering function such as a rendering function produced with the method disclosed in commonly-assigned U.S. Pat. No. 5,300,381 by Buhr et al. In general, optimal results are obtained using rendering functions that have a sigmoid shape, i.e., rendering functions having a zero or near slope for extreme input pixel values and having a maximum magnitude slope that is achieved for mid-tone input values. Some rendering functions can have a relatively high slope for the darkest domain of input pixel values but almost all rendering functions have a zero or near zero slope characteristic for the lightest domain of pixel values. The rendering function, to an extent, mimics the photo response characteristics of photographic paper used in analog imaging applications. FIG. 3a shows a graph of an example rendering function $R(x)$ (indicated by curve 590) that is suitable for use with the present invention. Point 591 corresponds to an input pixel value equal to the reference gray point. Point 592 indicates the rendering function response for a highlight pixel value corresponding to a light region in the original digital image 101. Point 593 indicates the rendering function response for a shadow pixel value corresponding to a dark region in the original digital image 101. Point 595 indicates the rendering function response corresponding to brightest reproduced output value of the output image device. Similarly, point 596 indicates the rendering function response corresponding to darkest reproduced output value of the output image device. Point 597 indicates the point on the rendering function for which the instantaneous slope has a maximum magnitude which does not necessarily coincide with the reference gray point 591. The point of maximum magnitude slope is also the inflection point of the sigmoid function, i.e. a local maximum or minimum in the corresponding slope function of the rendering function R(x). The example rendering function shown in FIG. 3a is appropriate for a digital imaging system that uses a 12-bit pixel value representation for processing digital images. Many output display devices accept digital images with an 8-bit pixel value representation. The example rendering function shown in FIG. 3a maps 12-bit input pixel values ranging from 0 to 4095 to output rendering pixel values ranging from 255 to 0.

Figure 3B:
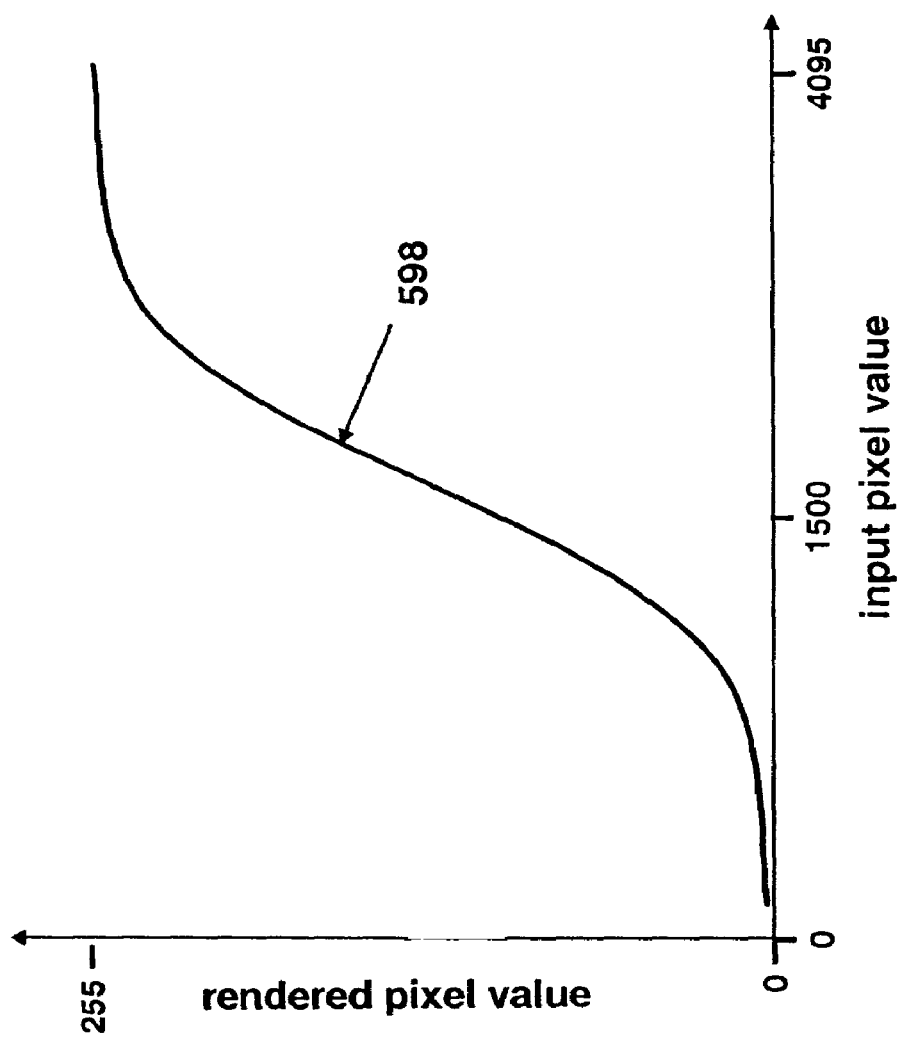
FIG. 3b is a graph of another example of a rendering function.

The example rendering function shown in FIG. 3a is typical for use with a digital printer that produces digital photographic prints. The output pixel value scale shown can relate to photographic paper densities, e.g. the digital printer can be calibrated such that each pixel code value is equal to 100 times the optical density that will be produced on the print. However, the present invention can also be used with electronic display devices. A typical rendering function for use with an electronic display device is shown in FIG. 3b as indicated by curve 598. Note that the rendering function R(x) shown in FIG. 3b produces higher numerical output rendering pixel values for higher numerical input pixel values. For a typical computer monitor device, the output pixel values will range from 0 (representing black) to 255 (representing white). The example rendering function shown in FIG. 3b maps 12-bit input pixel values ranging from 0 to 4095 to output rendering pixel values ranging from 0 to 255.

The last operation performed by the rendering module 340 is the encoding of the output pixel values for use with an output image device. Most output image devices are calibrated to accept pixel data with a known implied relationship. For example, some digital image printers are calibrated to accept visual lightness related pixel data while other devices are calibrated for optical density related pixel data. The encoding operation performs an intensity transformation that prepares the pixel data for the specific device.

The rendering module 340 can also perform the operation of preparing the image pixel data of the enhanced digital image for an unspecified output image device. For example, the pixel data can be transformed into CIE XYZ coordinates such as defined by the International Image Consortium's Profile Connection Space.

Referring to FIG. 2, the chain of image processing modules is designed to work well with or without the inclusion of the tone scale module 330. The scene balance module 320 accommodates exposure and illumination system variability. The rendering module 340 prepares the image data for viewing on an output image device. It will be appreciated by those skilled in the art that the digital image processor 20 as depicted in FIG. 2 without the use of the tone scale module 330 will yield acceptable photographic results. That is, the contrast, lightness, and color reproduction of the system are set for optimal photographic results for the majority of typical digital images. The inclusion of the tone scale module 330 enhances the appearance of the processed digital images such that digital images that deviate from the norm, in terms of dynamic range, will be tonally enhanced and digital images that are at the norm for the system will be unaltered by the tone scale module 330. For a typical implementation of the present invention, the dynamic range of the original digital images 101 (ratio of corresponding original scene intensities based on the extremes of the image) is approximately 64 to 1. The enhanced digital images corresponding to processed original digital images 101 that have approximately a 64 to 1 dynamic range will be little affected by the tone scale module 330. Conversely, the enhanced digital images corresponding to processed original digital images 101 that have a dynamic range greater than 64 to 1 and less than 64 to 1 can be significantly enhanced by the tone scale module 330, i.e. rendered with more detail and more color saturation. In particular, low contrast original digital image will, in general, experience a contrast gain, while high contrast original digital images will, in general, experience a reduction in contrast resulting in more spatial detail and more saturated color.

Figure 4:
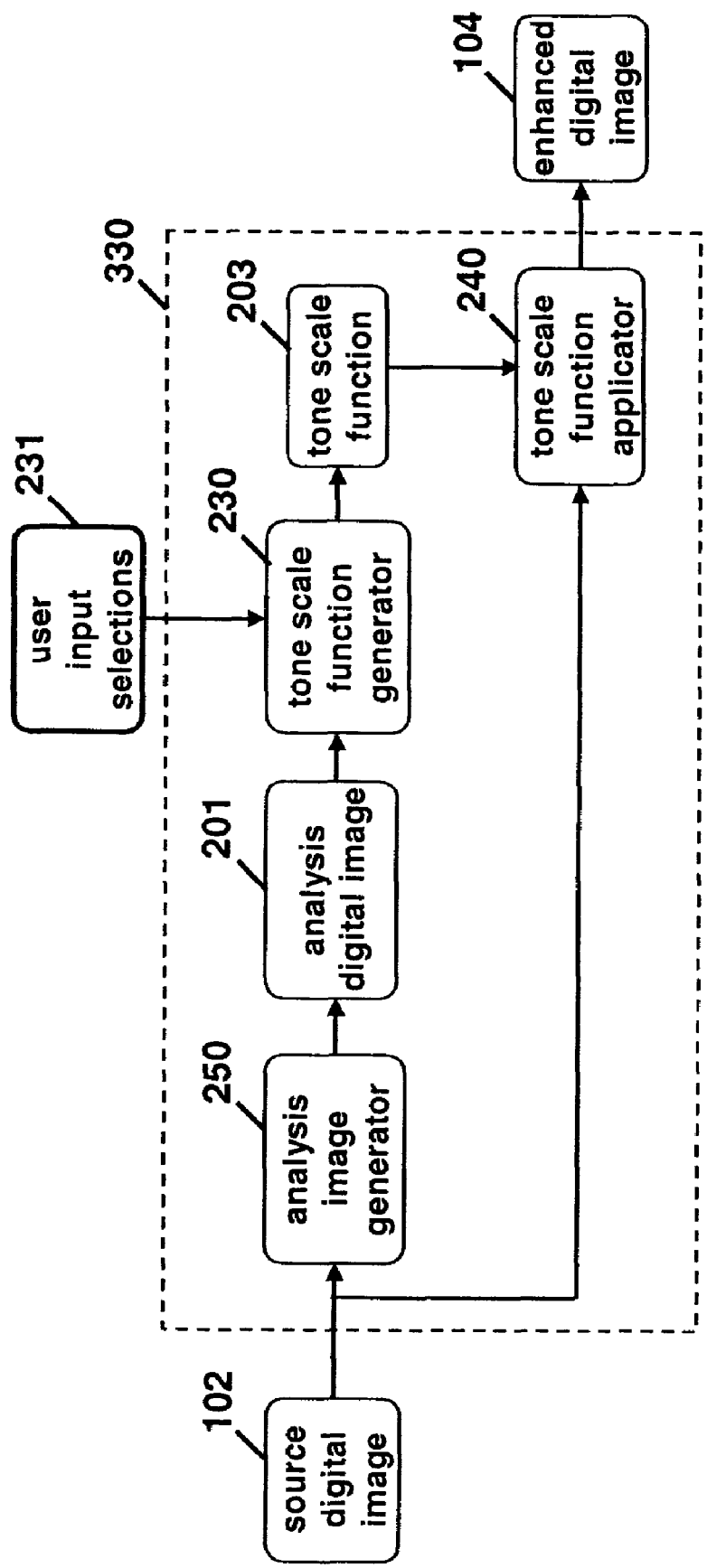
FIG. 4 is a functional block diagram of the tone scale module.

The tone scale module 330 depicted in FIG. 2 is illustrated in more detail in FIG. 4. The source digital image 102 is received by the analysis image generator 250 which produces a lower spatial resolution digital image from source digital image 102 called the analysis digital image 201. The tone scale function generator 230 receives the analysis digital image 201, analyzes the content of the analysis digital image 201, and produces the tone scale function 203. The tone scale function is a single valued function that is defined for the range of pixel values in the source digital image 102. The tone scale function applicator 240 applies the tone scale function 203 to the source digital image 102 to generate the enhanced digital image 104. The shape of the tone scale function determines the contrast and lightness changes that will be imparted to the enhanced digital image 104. In this embodiment, the tone scale function applicator 240 applies the tone scale function 203 to the individual color digital image channels of the source digital image 102.

Figure 5:
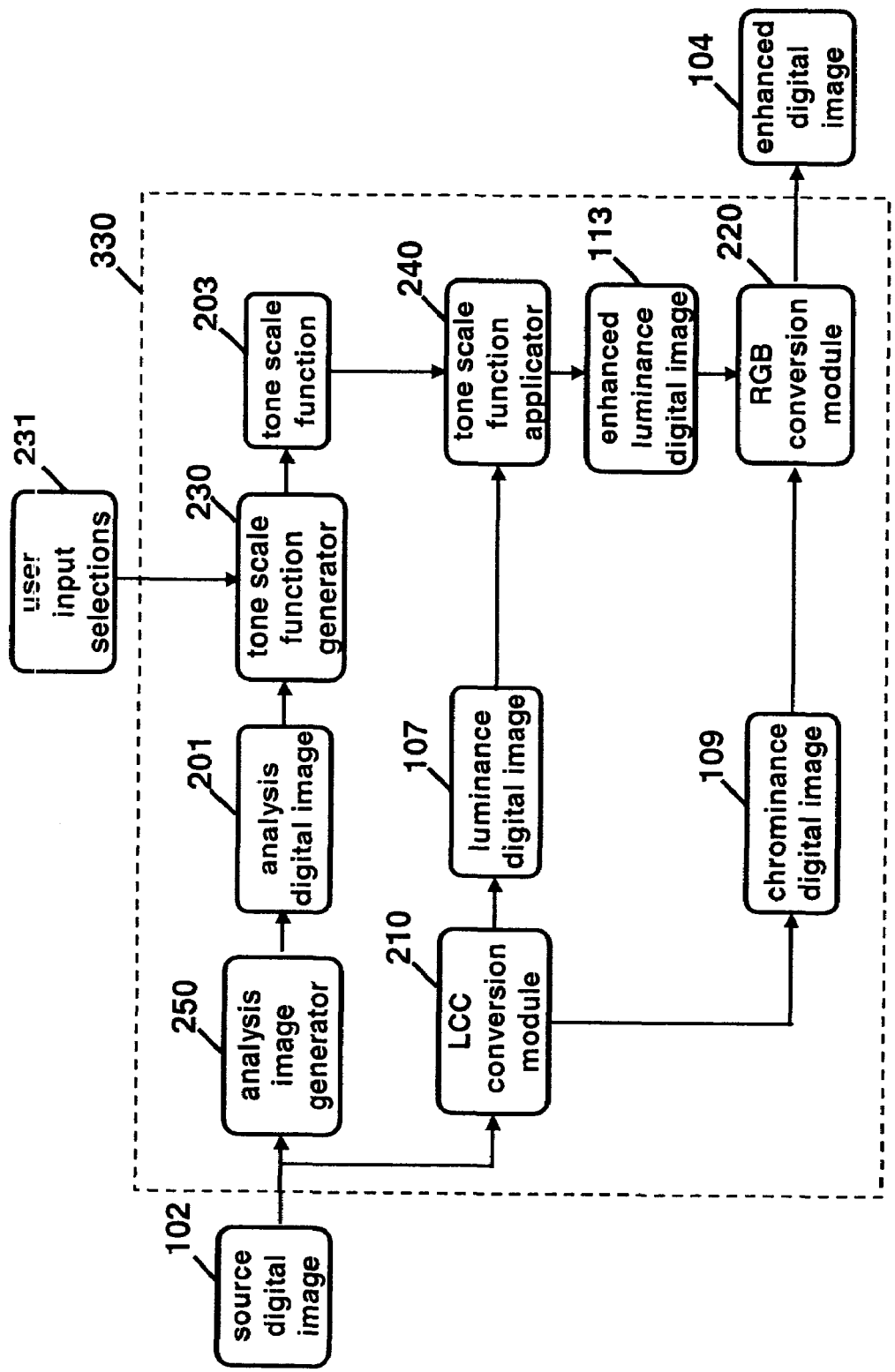
FIG. 5 is a functional block diagram of another embodiment of the tone scale module.

The present invention can also be practiced with an original digital image 101 that is in a luminance-chrominance representation. FIG. 5 shows the preferred embodiment of the present invention that applies the tone scale function 203 to a luminance digital image 107 derived from the source digital image 102. The LCC conversion module 210 receives the source digital image 102 which includes red, green, and blue pixels, and produces a luminance digital image 107 containing a single digital image channel and chrominance digital image 109 containing two chrominance, or color difference, digital image channels. It is also possible that the image input devices 10a, 10b, and 10c produced the original digital image 101 in a luminance-chrominance representation. If such is the case, the LCC conversion module 210 is not employed. The analysis image generator 250 receives the source digital image 102 and generates the analysis digital image 210 as described above. Similarly, the tone scale function generator 230 receives the analysis digital image 201 and generates the tone scale function 203. The tone scale function applicator 240 receives the tone scale function 203 and applies it to the luminance digital image 107 which results in the enhanced luminance digital image 113. The RGB conversion module 220 combines the enhanced luminance digital image 113 and the chrominance digital image 109 to produce the enhanced digital image 104.

The LCC module 210 shown in FIG. 5 employs a 3 by 3 element matrix transformation to convert the red, green, and blue pixel values of the source digital image 102 into luminance and chrominance pixel values. Let the variables $R_{ij}$, $G_{ij}$, and $B_{ij}$ refer to the pixel values corresponding to the red, green, and blue digital image channels located at the $i^{th}$ row and $j^{th}$ column. Let the variables $L_{ij}$, $GM_{ij}$, and $ILL_{ij}$ refer to the transformed luminance, first chrominance, and second chrominance pixel values respectively of an LCC representation digital image. The 3 by 3 elements of the matrix transformation are described by (1).

$$L_{ij}=0.333R_{ij}+0.333G_{ij}+0.333B_{ij}$$

$$GM_{ij}=0.25R_{ij}+0.50G_{ij}-0.25B_{ij}$$

$$ILL_{ij}=-0.50R_{ij}+0.50B_{ij} \qquad (1)$$

Those skilled in the art will recognize that the exact values used for coefficients in the luminance/chrominance matrix transformation may be altered and still yield substantially the same effect. An alternative also used in the art is described by (2).

$$L_{ij}=0.375R_{ij}+0.500G_{ij}+0.125B_{ij}$$

$$GM_{ij}=-0.250R_{ij}+0.500G_{ij}-0.250B_{ij}$$

$$ILL_{ij}=-0.500R_{ij}+0.50B_{ij} \quad (2)$$

The RGB conversion module 220 shown in FIG. 5 employs a 3 by 3 element matrix transformation to convert the luminance and chrominance pixel values into red, green, and blue pixel values by performing the inverse matrix operation to the LCC conversion module 210. The matrix elements of the RGB conversion module are given by (3) and represents the inverse matrix of the matrix given by (1).

$$R_{ij}=L_{ij}-0.666GM_{ij}-ILL_{ij}$$

$$G_{ij}=L_{ij}+1.333GM_{ij}$$

$$B_{ij}=L_{ij}-0.666GM_{ij}+ILL_{ij} \quad (3)$$

Figure 6:
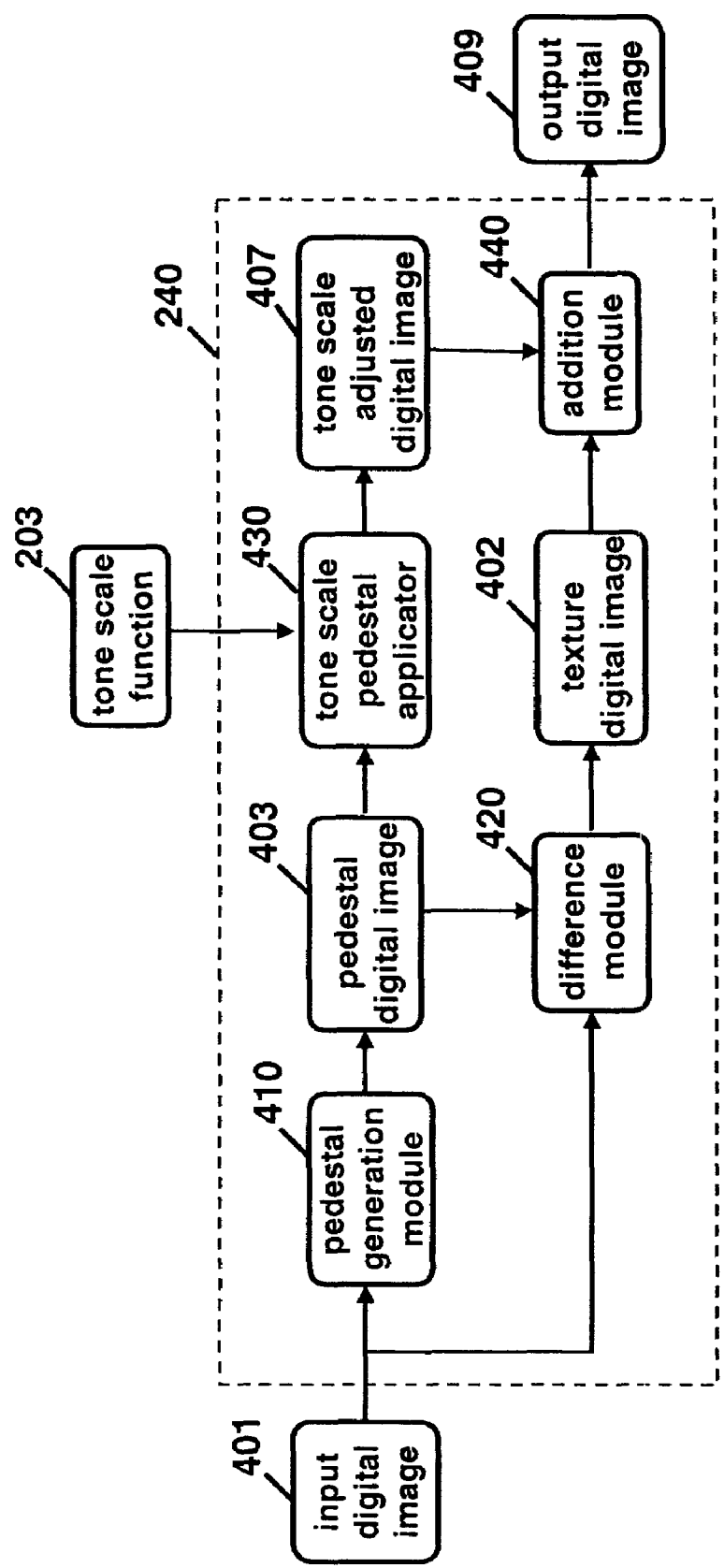
FIG. 6 is a functional block diagram of embodiment of the tone scale function applicator.

The tone scale function applicator 240 shown in FIG. 4 and FIG. 5 is shown in more detail in FIG. 6. The pedestal generation module 410 receives the digital image to be processed denoted by the input digital image 401 and produces the pedestal digital image 403. The pedestal generation module 410 employs a spatial filter, applied to the input digital image 401, that removes texture from the input digital image 401 but leaves edge information. In the context of the present invention, texture refers to image content including fine spatial detail and spatial shading structure. As a natural consequence of the filter, noise is also removed. Thus the pedestal digital image 403 is a highly smoothed version of the input digital image 401 with much of the edge content of the input digital image 401. The pedestal digital image 403 is subtracted from the input digital image 401 by the difference module 420 resulting in the texture digital image 402. It will be appreciated that all of the information of the input digital image 401 is contained in either the pedestal digital image 403 or the texture digital image 402. The tone scale pedestal applicator 430 applies the tone scale function 203 to the pedestal digital image 403 resulting in the tone adjusted digital image 407. Therefore, the tonal characteristics of the pedestal digital image 403 are enhanced by the application of the tone scale function 203 without affecting the texture content of the input digital image 401. The addition module 440 combines the tone adjusted digital image 407 with the texture digital image 402 to produce the output digital image 409. Therefore, the output digital image 409 is a tone scale enhanced version of the input digital image 401 that has the texture image structure content of the input digital image 401.

Applying a tone scale function by using a spatial filter is particularly advantageous when the tone scale function is highly compressive. When highly compressive tone scale functions are applied directly to an input digital image, the tonal characteristics will be enhanced but the texture image structure can be diminished in magnitude. Using a spatial filter to apply the tone scale function can achieve the desired tone scale enhancement while maintaining the texture image structure. A variety of spatial filters can be used to achieve an improved result. The present invention uses the spatial filter disclosed in commonly-assigned U.S. Pat. No. 6,317,521 by Gallagher and Gindele which employs the use of a control, or masking, signal to preserve the edges in the pedestal digital image 403. The present invention can also be used with a similar method disclosed by Lee in commonly-assigned U.S. Pat. No. 6,285,798. Another spatial filter that can be employed is a simple low-pass filter, such as a two dimensional Gaussian filter. However, if a low-pass filter is used, the dimension of the Gaussian standard deviation parameter should be very large, e.g. one quarter of the dimension of the digital image being processed.

It should also be noted that for mildly compressive tone scale functions it may not be necessary to use a spatial filter. Thus the tone scale function applicator 240 can apply the tone scale function 203 directly to the pixels of the input digital image 401 to produce the output digital image 409. It should also be noted that for expansive tone scale functions, the direct application of the tone scale function 203 to the input digital image 401 can result in a greater level of tonal enhancement than if a spatial filter is used as described above. This is principally due to the amplification of image texture resulting from the expansive tone scale function. However, for some digital images the amplification of image texture can be a detriment to image quality if the image texture also contains high levels of noise. Therefore, applying the tone scale function 203 with a spatial filter as described above can be an advantage for both compressive and expansive tone scale functions.

The tone scale function generator 230 shown in FIG. 4 and FIG. 5 is described in more detail hereinbelow. The tone scale function generator 230 can be used in either an automatic mode, wherein the tone scale function 203 is calculated using the pixels of the analysis digital image 201, or in a manual mode, wherein the tone scale function 203 is calculated using user input selections 231 provided via a graphical user interface. For either mode, the mathematical formulation for the calculations is the same.

The tone scale function 203, is a single valued function, i.e. one output pixel value for each input pixel value, defined for the range of pixels values in the source digital image 102. The shape of the tone scale function 203 is an important aspect of the present invention since the mathematical shape determines the effect on the processed digital images. The present invention constructs the tone scale function 203 from at least two function segments wherein no two function segments share more than one input pixel value in common. The preferred embodiment of the present invention uses two function segments and defines a reference gray point pixel value corresponding to an 18% scene reflector as the input pixel value in common that divides the function domain into the two tone scale segments. The function segment relating to the brighter image regions, i.e. image regions corresponding to bright regions of the original photographed scene, is called the highlight tone scale segment. The function segment relating to the darker image regions, i.e. image regions corresponding to dim regions of the original photographed scene, is called the shadow tone scale segment. It should be noted that the tone scale function 203 is a continuous function insofar as the implementation in computer software and/or hardware will allow. It should also be noted that the tone scale function 203 can have a continuous first derivative. However, although desirable, the property of a continuous first derivative is not a requirement of the present invention.

The pixel polarity of a digital image used in a digital imaging system is an arbitrary decision made by the system architect. For example, positive pixel polarity digital images have pixels wherein higher numerical values relate to more light having been received. Conversely, negative pixel polarity digital images have pixels wherein higher numerical values relate to less light having been received. The present invention can be used with digital images of either pixel polarity. However, in the interest of clarity, the following description will be assume a positive pixel polarity convention. Those skilled in the art will recognize that references made to the increasing or decreasing function slope values are with respect to positive pixel polarity digital images. The description of function slope characteristics must be reversed for systems using negative pixel polarity digital images. This is an important aspect of interpretation since mathematically an increasing or decreasing function is defined with respect to numerically increasing abscissa values. For example, in the description of the construction of the highlight and shadow component functions given hereinbelow, the shadow component functions are described as having a monotonically increasing slope property while the highlight component functions are described as having a monotonically decreasing slope property. This description is with regard to a positive pixel polarity convention. For a negative pixel polarity convention, the equivalent shadow component functions would be described as having a monotonically decreasing slope property while the equivalent highlight component functions would be described as having a monotonically increasing slope property. Similarly, for a positive pixel polarity convention, the tone scale function has a slope function that is always greater than or equal to zero. Conversely, or a negative pixel polarity convention, the tone scale function has a slope function that is always less than or equal to zero.

The highlight tone scale segment is constructed from one or more component functions each of which satisfies the following constraints: 1) the component function must have a monotonically decreasing slope function for all input pixel values equal to or greater than the reference gray point, and 2) the component function must have a monotonically increasing function value for all input pixel values equal to or greater than the reference gray point and less than or equal to a maximum input pixel value expressed in the digital image. A function is monotonic over a given domain if the function does not have a reversal of its first derivative function (for digital implementations the slope function is taken as a reasonable approximation of the first derivative function). It should also be noted that the function characteristics for input pixel values greater than what is expressed in a particular image is an academic issue since no pixels will be affected. Both of the above mentioned constraints are important and require some explanation.

The highlight tone scale segment relates to the bright pixels, i.e. pixels relating to more light having been received. In general, for high dynamic range digital images the corresponding rendered digital images produced without the present invention have little or no spatial detail in the very brightest image regions. This is a consequence of the overall high system contrast required to pleasingly render digital images of average dynamic range. Therefore, for high dynamic range digital images some of the image content contained in the bright pixels cannot be rendered such that spatial detail modulation is preserved in the rendered digital image 103. Improved spatial detail modulation can be achieved if the tone scale function 203 maps high input pixel values to lower output pixel values. This results in processed digital images with darker highlight content in the resultant rendered digital image 103. There are many functions that can perform such an input to output mapping operation. However, monotonically increasing functions have been experimentally determined to be more robust, i.e. produce fewer image artifacts, than functions that are not monotonic.

While many monotonic functions can achieve the operation of mapping high input pixel values to lower output pixel values, all functions impose some form of compromise in contrast with regard to image regions corresponding to different average pixel values. In particular, the instantaneous slope value (first derivative) of the component functions used to construct the highlight tone scale segment can significantly affect the perception of contrast and spatial detail modulation in the resultant rendered digital image 103. Therefore, the highlight tone scale segment constructed using component functions having a monotonically decreasing instantaneous slope value can improve the rendering of spatial detail modulation for bright image regions by mapping highlight pixels to lower output pixel values. Image regions corresponding to higher instantaneous slope values within the domain of the highlight tone scale segment tend to preserve more image detail modulation. Thus the monotonically decreasing instantaneous slope condition advantages image content corresponding to pixel values that are numerically closer in value to the reference gray point. In general, important image content, such as the main subject region, tends to be numerically closer to the reference gray point while background image content tends to be exhibited more uniformly with regard to pixel values.

Similarly, the shadow tone scale segment is constructed from one or more component functions each of which satisfies the following constraints: 1) the component function must have a monotonically increasing slope function for all input pixel values equal to or less than the reference gray point, and 2) the component function must have a monotonically increasing function value for all input pixel values equal to or less than the reference gray point and greater than or equal to a minimum input pixel value expressed in the digital image. Similarly, the monotonicity property of the component functions used to construct the shadow tone scale segment relates to more robust image quality results. The monotonically increasing slope function property of the component functions used to construct the shadow tone scale segment is similarly important since this condition also advantages image content corresponding to pixel values that are numerically closer in value to the reference gray point. For high dynamic range images, the monotonically increasing slope function property of the component functions used to construct the shadow tone scale segment achieves a low input pixel value to higher output pixel value mapping operation. This results in processed digital images with lighter shadow content in the resultant rendered digital image 103.

A natural consequence of the above mentioned slope function constraints produces tone scale functions that have high slope function values at the reference gray point. Therefore the choice of the reference gray point value is important since it determines which regions in images will experience high slope function values. A reference gray point value corresponding to an 18% gray scene reflector is chosen since it represents approximately the midpoint of perceptual lightness. Other choices for the value of the reference gray point can also produce excellent results. Reasonable values for the reference gray point range from a 10% scene reflector value to a 25% scene reflector value.

In a first embodiment of the tone scale function generator 230 shown in FIG. 4 and FIG. 5, both the highlight and shadow tone scale segments are constructed using a single component function based on exponential functions. The component function used for the highlight tone scale segment is given by the formula (4)

$$f_{h1}(x) = \beta_{h1}(1 - e^{-(x-x_p)/\alpha_{h1}}) + x_p \tag{4}$$

where $x_p$ represents the reference gray point, and $\beta_{h1}$ and $\alpha_{h1}$ are numerical constants that determine the shape and slope of the component function $f_{h1}(x)$. The component function used for the shadow tone scale segment is given by the formula (5)

$$f_{s1}(x) = \beta_{s1}(1 - e^{-(x-x_p)/\alpha_{s1}}) + x_p \quad (5)$$

where $\beta_{s1}$ and $\alpha_{s1}$ are numerical constants that similarly determine the shape and slope of the component function $f_{s1}(x)$. If a slope constraint of 1.0 is imposed at the reference gray point, the constants $\beta_{h1}$ and $\beta_{s1}$ are equal to $\alpha_{h1}$ and $\alpha_{s1}$ respectively. For this condition, the equations for the functions $f_{h1}(x)$ and $f_{s1}(x)$ are given as (6) and (7)

$$f_{h1}(x) = \alpha_{h1}(1 - e^{-(x-x_p)/\alpha_{h1}}) + x_p \quad (6)$$

$$f_{s1}(x) = \alpha_{s1}(1 - e^{-(x-x_p)/\alpha_{s1}}) + x_p \quad (7)$$

and the expression for the tone scale function 203 $T(x)$ is given by (8).

$$T(x) = f_{h1}(x) \text{ for } x \geq x_p, \quad (8)$$

$$T(x) = f_{s1}(x) \text{ for } x < x_p$$

The highlight component function is constrained to pass through a specified coordinate point defined by an abscissa value $x_{ho}$ that results in an ordinate value $x_w$ as given by (9).

$$x_w = \alpha_{h1}(1 - e^{-(x_{ho}-x_p)/\alpha_{h1}}) + x_p \quad (9)$$

This constraint achieves a highlight white point mapping objective. For the highlight component function, the white point value $x_w$ is predetermined based on the pixel value that is preferably mapped by the rendering function $R(x)$ to correspond to a photographic paper density of approximately 0.2. With the variables $x_w$ and $x_p$ defined, the value of the variable $\alpha_{h1}$ can be solved for a given value of $x_{ho}$ using expression (9) by an iterative numerical solution. Similarly, the shadow component function is constrained to pass through a specified coordinate point defined by an abscissa value $x_{so}$ that results in an ordinate value $x_b$ as given by (10).

$$x_b = \alpha_{s1}(1 - e^{-(x_{so}-x_p)/\alpha_{s1}}) + x_p \quad (10)$$

This constraint achieves a shadow black point mapping objective. For the shadow tone scale function, the black point value $x_w$ is predetermined based on the pixel value that is preferably mapped by the rendering function $R(x)$ to correspond to a photographic paper density of approximately 2.0. With the variables $x_b$ and $x_p$ defined, the value of the variable $\alpha_{s1}$ can be solved for a given value of $x_{so}$ using expression (10) by the iterative numerical solution. The iterative numerical solution for expressions (9) and (10) includes a process of first estimating an initial value of $\alpha_{s1}$, calculating each side of the equation, calculating an error term as the difference, inspecting the error, making an adjustment to the estimate of $\alpha_{s1}$, and iterating the procedure until the error term is of an acceptably low magnitude. The iterative solution results are computed for all possible values of $\alpha_{s1}$ and stored in a LUT. The same calculations and procedure are used to determine the value of $\alpha_{h1}$.

Figure 7:
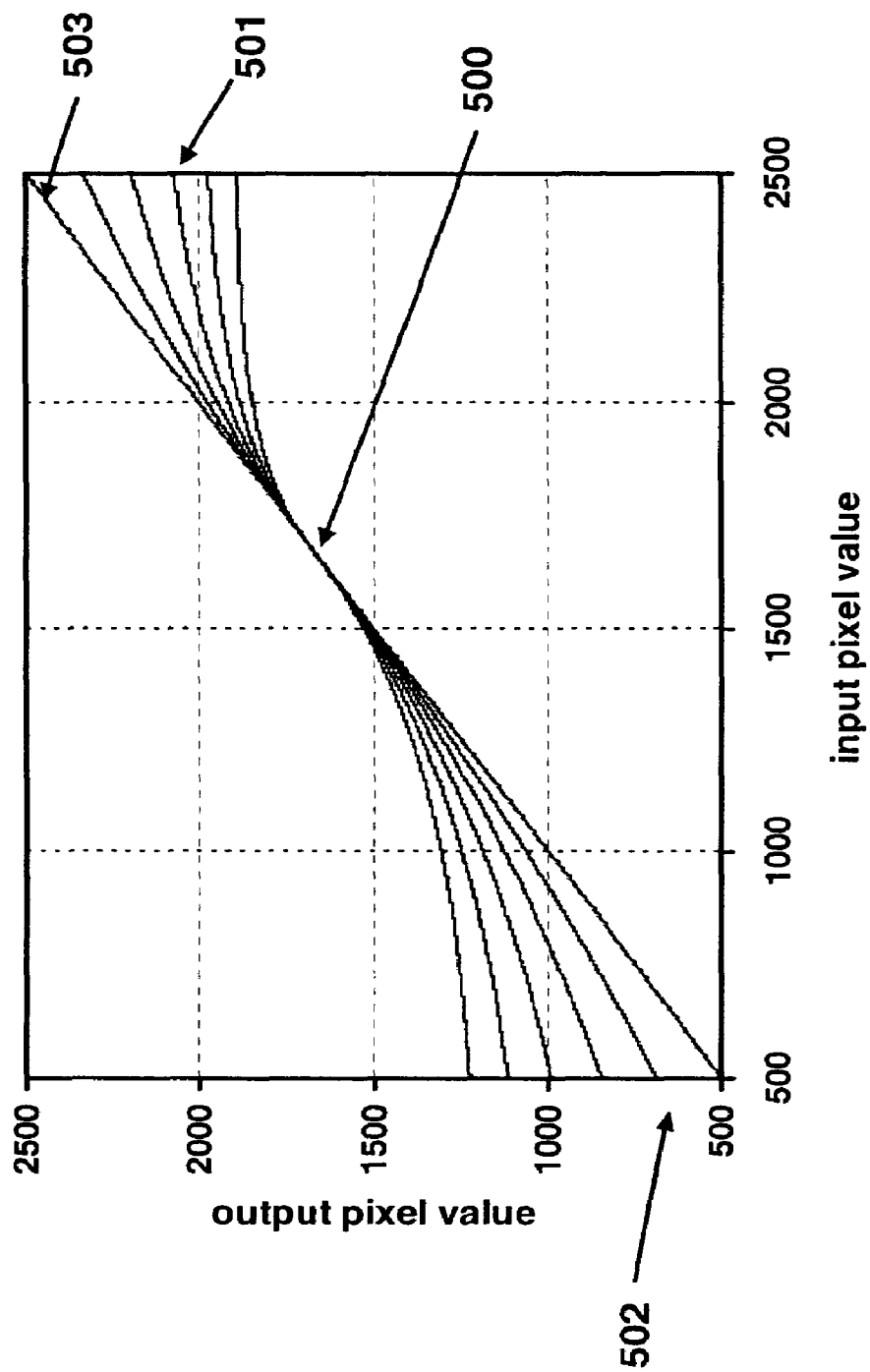
FIG. 7 is a graph illustrating a family of highlight tone scale segments and a family of shadow tone scale segments.

The variables $x_{ho}$ and $x_{so}$ are control variables in the expressions (9) and (10) that, once selected, determine the function shape and slope characteristics for expressions (6) and (7). FIG. 7 shows a graph depicting a family of curves that represent highlight tone scale segments generated with different values of $x_{ho}$ and a family of curves that represent shadow tone scale segments generated with different values of $x_{so}$. Point 500 represents the reference gray point $x_p$. Curve 501 represents a highlight tone scale segment constructed from one highlight component function. Curve 502 represents a shadow tone scale segment constructed from one shadow component function. Line 503 represent the one-to-one input-to-output line. For each of the highlight tone scale segments shown in FIG. 7, the highlight component function graphed has a monotonically decreasing instantaneous slope value. Similarly, for each of the shadow tone scale segments shown in FIG. 7, the component function graphed has a monotonically increasing instantaneous slope value. The tone scale function 203 can be constructed from any of the highlight tone scale segments depicted in FIG. 7 in combination with any of the shadow tone scale segments since the variables $x_{ho}$ and $x_{so}$ can be selected independently. Thus the shape of two tone scale segments can be controlled independent from one another.

The expressions (6) and (7) were derived with the constraint that the slope function (corresponding to the component function), when evaluated at the reference gray point, must be equal to 1.0. In another embodiment, exponential functions are used in similar fashion with a slope constraint imposed. The slope of the highlight component function must be equal to a selected value $\phi_h$ and the shadow component function must be equal to a selected value $\phi_s$. For this embodiment, the imposed slope constraint results in a relationship between the variables $\beta_{h1}$ and $\alpha_{h1}$ in expression (4) and $\beta_{s1}$ and $\alpha_{s1}$ in expression (5) given by expressions (11) and (12) respectively.

$$\beta_{h1} = \phi_h \alpha_{h1} \quad (11)$$

$$\beta_{s1} = \phi_s \alpha_{s1} \quad (12)$$

The expressions for the highlight component function and the shadow component function are given by expressions (13) and (14) respectively.

$$f_{h1}(x) = \phi_h \alpha_{h1}(1 - e^{-(x-x_p)/\alpha_{h1}}) + x_p \quad (13)$$

$$f_{s1}(x) = \phi_s \alpha_{s1}(1 - e^{-(x-x_p)/\alpha_{s1}}) + x_p \quad (14)$$

The first derivative functions that represent the slope function of the highlight and shadow component functions are given by expressions (15) and (16) respectively.

$$f_{h1}'(x) = \phi_h e^{-(x-x_p)/\alpha_{h1}} \quad (15)$$

$$f_{s1}'(x) = \phi_s e^{-(x-x_p)/\alpha_{s1}} \quad (16)$$

If the value of $x_{ho}$ is greater than the value of $x_w$, the highlight component function will map a greater range of input pixel values to a lesser range of output pixel values and is therefore considered a compressive function. Conversely, if the value of $x_{ho}$ is less than the value of $x_w$, the highlight component function will map a lesser range of pixel values to a greater range of pixel values and is therefore considered an expansive function. Similarly, if the value of $x_{so}$ is less than the value of $x_b$, the shadow component function will map a greater range of input pixel values to a lesser range of output pixels value and is therefor considered a compressive function. Conversely, if the value of $x_{so}$ is greater than the value of $x_b$, the shadow component function will map a lesser range of pixel values to a greater range of pixel values and is therefore considered an expansive function. Therefore, based on the values of the variables $x_{ho}$ and $x_w$, the highlight tone scale segment can be classified as either compressive, expansive, or neutral. When the value $x_{ho}$ is equal to the value of $x_w$, the highlight tone scale segment is classified as neutral since for this unique condition the highlight tone scale segment assumes the identity mapping function. Based on the values of the variables $x_{so}$ and $x_b$, the shadow tone scale segment can be classified as either compressive, expansive, or neutral. Similarly, when the value $x_{so}$ is equal to the value of $x_b$, the shadow tone scale segment is classified as neutral since for this unique condition the shadow tone scale segment assumes the identity mapping function.

For compressive highlight component functions, the numerical constant $\alpha_{h1}$ is positive. The corresponding slope function of the highlight component function given by expression (15) for positive values of $\phi_h$ yields positive slope function values for all x values greater than or equal to the reference gray point $x_\rho$. The expression for the second derivative function, or the slope function of the slope function of the highlight component function is given by expression (17).

$$f_h''(x) = -(\phi_h/\alpha_{h1})e^{-(x-x_\rho)/\alpha_{h1}} \qquad (17)$$

Figure 8A:
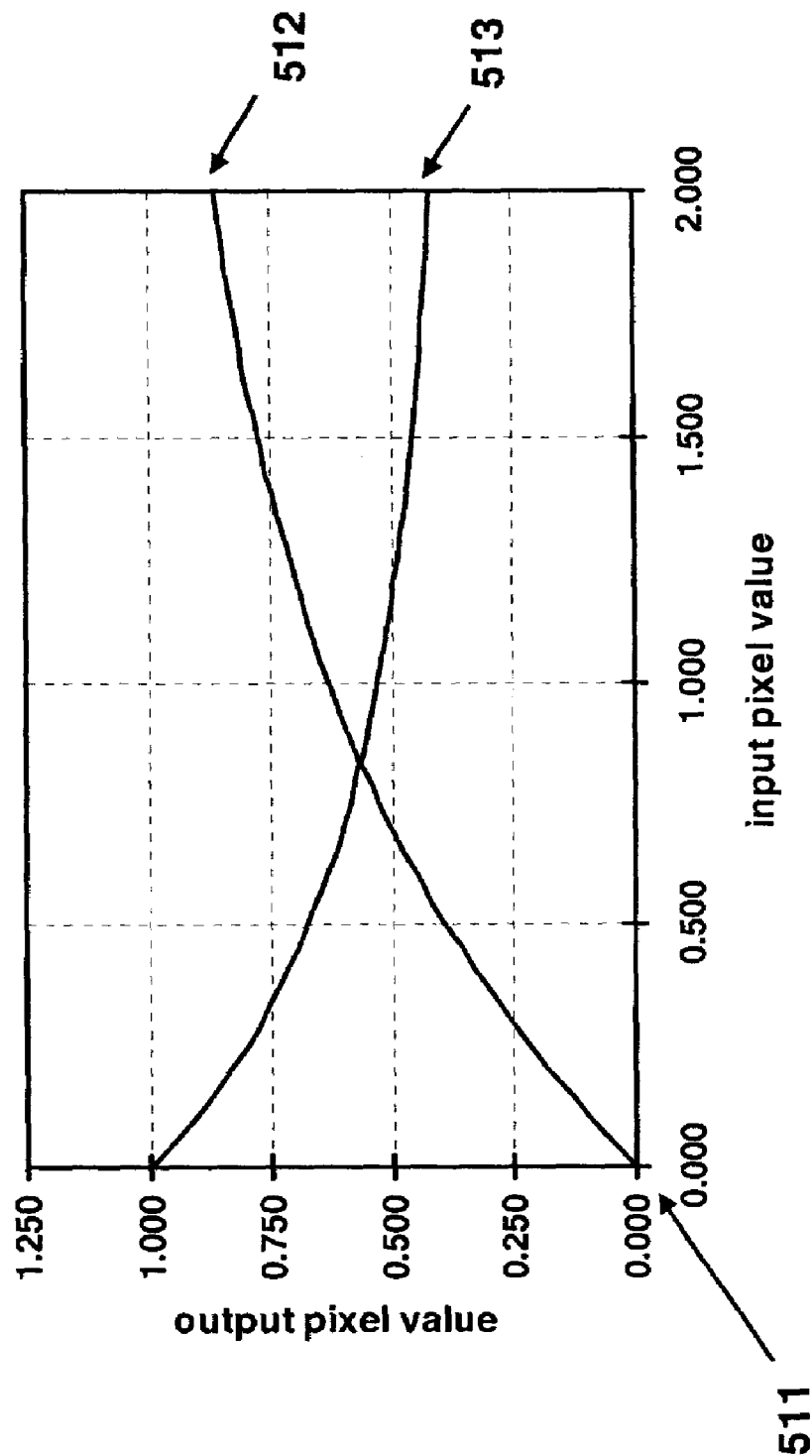
FIG. 8a is a graph of an example of a compressive highlight component function and its corresponding slope function.

FIG. 8a shows an example graph of a highlight tone scale segment generated with a $\phi_h$ variable set to 1.0, a reference gray point set to 0.0 and a $\alpha_{h1}$ variable set to 1.0. As can be seen by inspection of the graph shown in FIG. 8a and by expression (17), positive values of $\alpha_{h1}$ and $\phi_h$ result in a compressive highlight tone scale segment with a monotonically decreasing slope function that assumes values that are greater than or equal to zero. Curve 512 depicts such a highlight component function used to construct a highlight tone scale segment and curve 513 depicts its corresponding slope function. The reference gray point is indicated by point 511.

Similarly, for compressive shadow component functions, the numerical constant $\alpha_{s1}$ is negative. The corresponding slope function of the shadow component function given by expression (16) for the positive values of $\phi_s$ yields positive slope values for all x values less than or equal to the reference gray point $x_\rho$. The expression for the second derivative function, or slope function of the slope function of the shadow component function is given by expression (18).

$$f_{s1}''(x) = -(\phi_s/\alpha_{s1})e^{-(x-x_\rho)/\alpha_{s1}} \qquad (17)$$

Figure 8B:
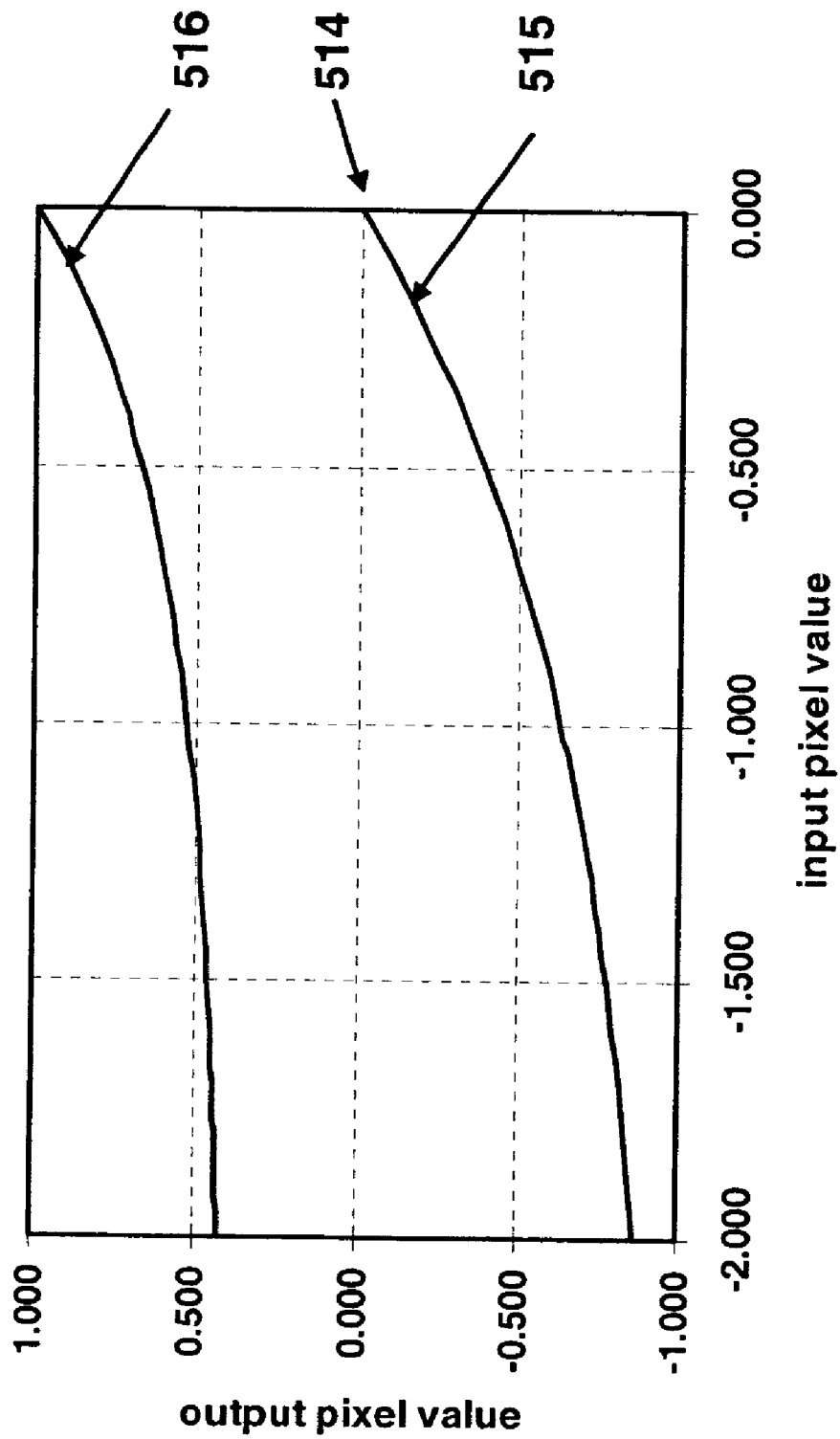
FIG. 8b is a graph of an example of a compressive shadow component function and its corresponding slope function.

FIG. 8b shows an example graph of a shadow tone scale segment generated with a $\phi_s$ variable set to 1.0, a reference gray point set to 0.0 and a $\alpha_{s1}$ variable set to 1.0. As can be seen by inspection of the graph shown in FIG. 8b and by expression (18), positive values of $\alpha_{s1}$ and $\phi_s$ result in a compressive shadow tone scale segment with a monotonically increasing slope function that assumes values that are greater than or equal to zero. Curve 515 depicts such a shadow component function used to construct a shadow tone scale segment and curve 516 depicts its corresponding slope function. The reference gray point is indicated by point 514.

Figure 8C:
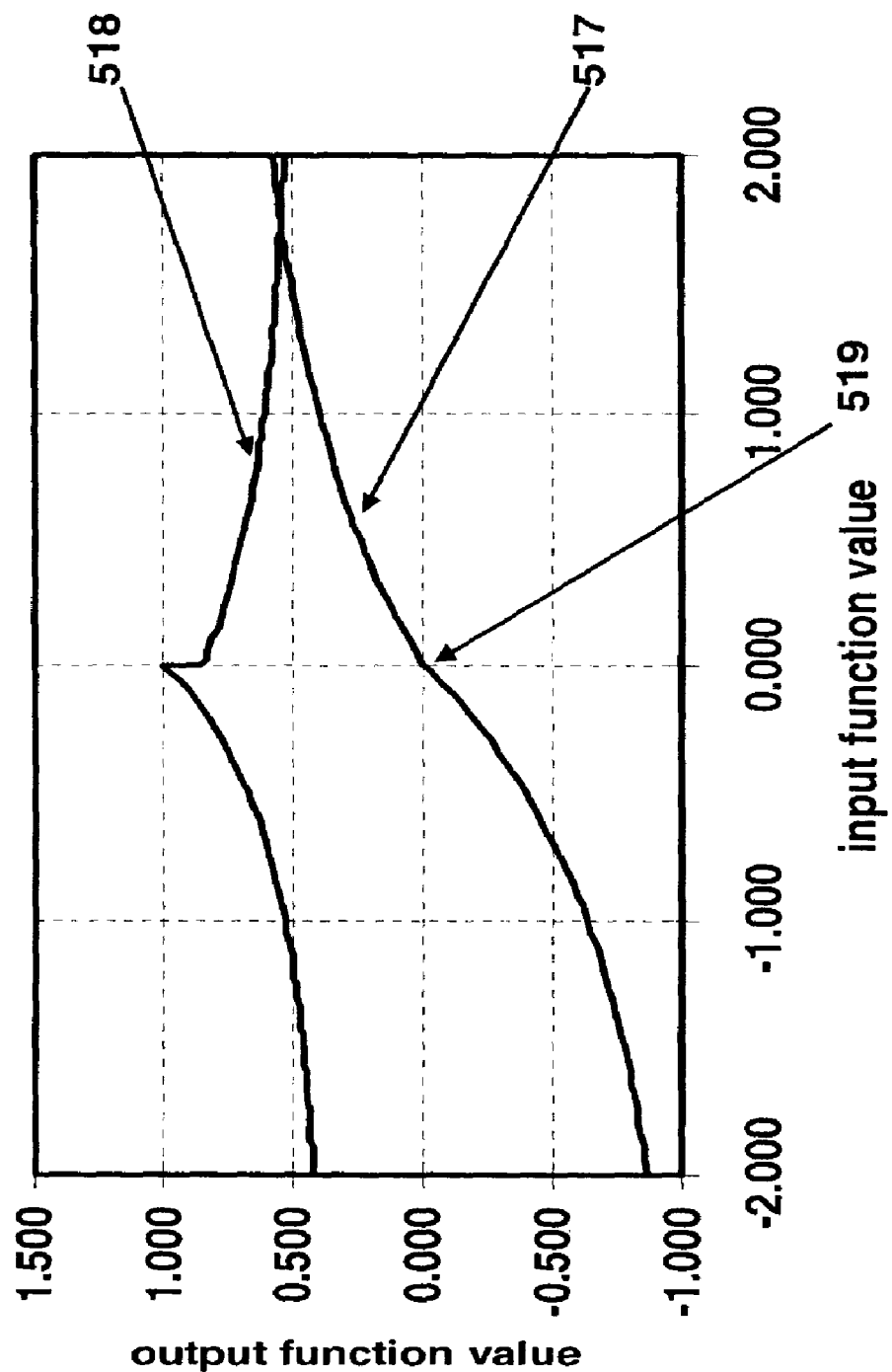
FIG. 8c is a graph of an example of a tone scale function constructed from a compressive highlight and shadow tone scale segment and its corresponding slope function.

The example tone scale function 203, shown in FIG. 8c, was constructed from a highlight and shadow tone scale segment, each of which is constructed from a single component function as described above. The equal slope condition, as described above, is not a requirement of the tone scale functions generated by the present invention. In the example tone scale function shown in FIG. 8c, the slopes of the highlight and shadow tone scale segments are not equal when evaluated at the reference gray point. Curve 517 represents the tone scale function 203 and curve 518 its corresponding slope function. The reference gray point is indicated by point 519. As can be seen in the example graph shown in FIG. 8c, the tone scale function is a monotonically increasing function, with a slope that is greater than or equal to zero, with a monotonically increasing slope for input values less than or equal to the reference gray point. The tone scale function also has a monotonically decreasing slope for input values greater than or equal to the reference gray point, and has a discontinuity in the slope function at the reference gray point. Tone scale functions having continuous slope function are, in general, desirable. However, experimentation has shown that the discontinuity in the slope function of a tone scale function when applied to digital images relating to natural photographed scenes is not often a problem. Other methods for generating tone scale functions, such as described in commonly-assigned U.S. Pat. No. 6,285,798 have imposed a continuity of slope constraint on the process of construction. The experimentation performed in support of the present invention has found that the continuity of slope constraint can be unnecessarily restrictive for some digital imaging applications. By not imposing the continuity of slope constraint, a greater diversity of useful tone scale functions can be produced. In particular, tone scale functions that are constructed in a manner responsive to the pixels of the source digital image when applied to the source digital image can achieve a greater level of overall contrast enhancement.

In another embodiment, the highlight tone scale segment is constructed from a compressive highlight component function. Recall that for compressive highlight component functions $x_{ho}$ is greater than $x_w$. For this embodiment, the expression given by (6) is combined with a linear function which relaxes the function's slope condition at the reference gray point. The expression for the highlight component function is given by (19)

$$f_{h1}(x) = (1-\phi_{HC})\alpha_{h1}(1-e^{-(x-x_\rho)/\alpha_{h1}}) + \phi_{HC}\gamma_{HC}(x-x_\rho) + x_\rho \qquad (19)$$

where the variable $\gamma_{HC}$ represents the average slope for the function over the interval from $x_\rho$ to $x_{ho}$ and is given by expression (20).

$$\gamma_{HC} = (x_w - x_\rho)/(x_{ho} - x_\rho) \qquad (20)$$

The variable $\phi_{HC}$ determines the contribution of the linear function to the highlight component function. The variable $\phi_{HC}$ can be selected to affect a change in the shape of the highlight tone scale segments that uses expression (19) as a highlight component function. If $\phi_{HC}$ is set to 0.0, expression (19) reverts to expression (6). If $\phi_{HC}$ is set to 1.0, the expression (19) assumes a linear function given by expression (21).

$$f_{h1}(x) = \gamma_{HC}(x - x_\rho) + x_\rho \qquad (21)$$

Thus the variable $\phi_{HC}$ is a control parameter that can be used to select the degree to which the highlight component function behaves as a pure exponential function. Similarly, the expression for the shadow component function is given by (22)

$$f_{s1}(x) = (1-\phi_{SC})\alpha_{s1}(1-e^{-(x-x_\rho)/\alpha_{s1}}) + \phi_{SC}\gamma_{SC}(x-x_\rho) + x_\rho \qquad (22)$$

where the variable $\gamma_{SC}$ represents the average slope for the function over the interval from $x_{so}$ to $x_\rho$ and is given by expression (23).

$$\gamma_{SC} = (x_b - x_\rho)/(x_{so} - x_\rho) \qquad (23)$$

The variable $\phi_{SC}$ can be selected to change the shape of the shadow tone scale segments that use expression (22) as a shadow component function. If $\phi_{SC}$ is set to 0.0, expression

(22) reverts to expression (7). If $\phi_{SC}$ is set to 1.0, expression (22) assumes a linear function given by expression (24).

$$f_{s1}s(x)=\gamma_{SC}(x-x_\rho)+x_\rho \qquad (24)$$

Thus the variable $\phi_{SC}$ is a control parameter that can be used to select the degree to which the shadow component function behaves as a pure exponential function.

Figure 9:
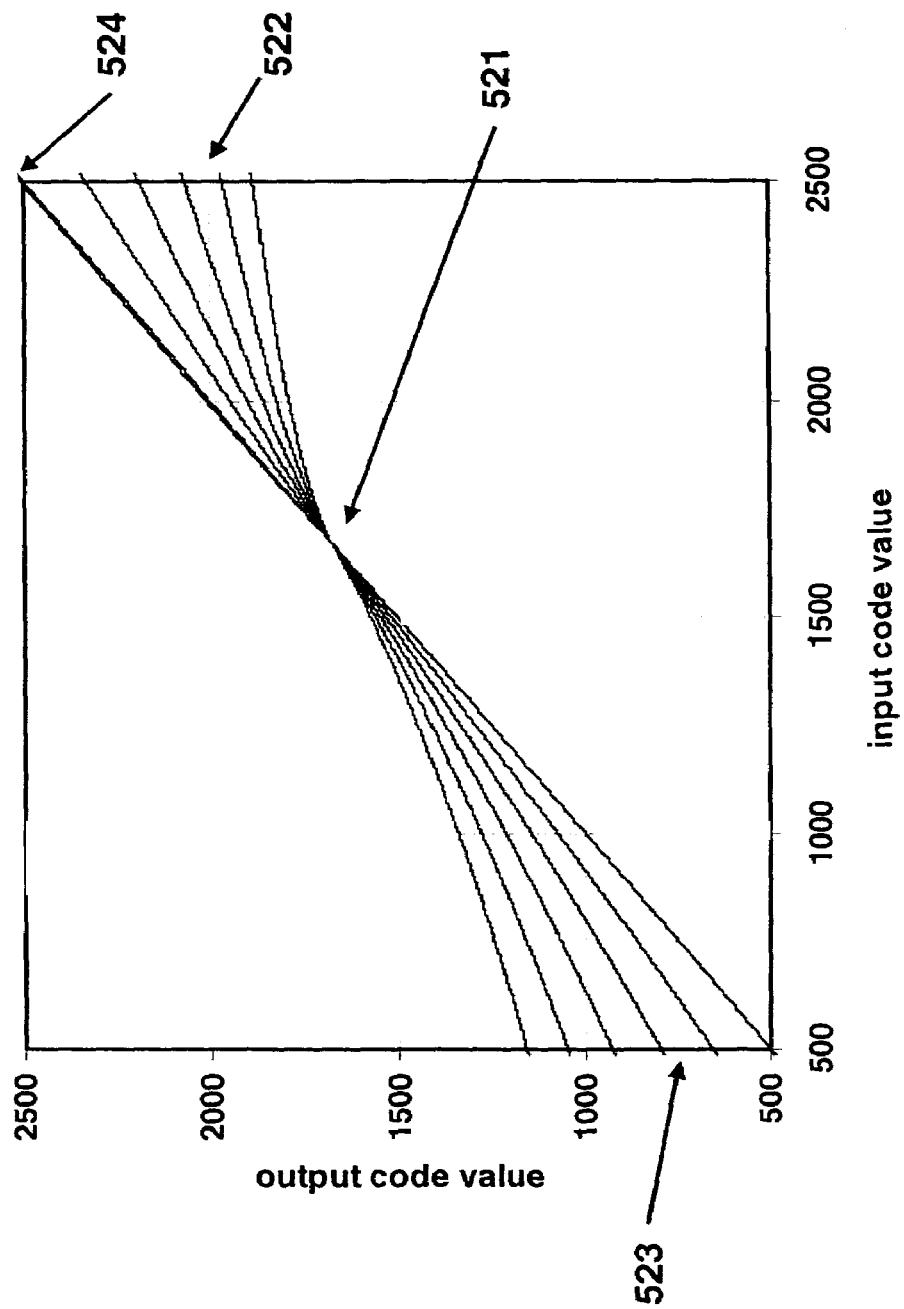
FIG. 9 is a graph illustrating a family of highlight tone scale segments and a family of shadow tone scale segments constructed.

Changing the $\phi_{HC}$ and $\phi_{SC}$ variables can have a significant impact on the appearance of the processed digital images. Setting the $\phi_{HC}$ and $\phi_{SC}$ variables toward 0.0 results in processed digital images that have a more traditional photographic high contrast appearance. Conversely, setting the $\phi_{HC}$ and $\phi_{SC}$ variables toward 1.0 results in processed digital images that have a more professional photographic low contrast appearance more appropriate for portraiture. FIG. 9 shows a graph depicting a family of curves that represent highlight tone scale segments generated with expression (19) using different values of $x_{ho}$ and a family of curves that represent shadow tone scale segments generated with expression (22) using different values of $x_{so}$. Point 521 represents the reference gray point $x_\rho$. Curve 522 represents a highlight tone scale segment constructed from one highlight component function. Curve 523 represents a shadow tone scale segment constructed from one shadow component function. Line 524 represent the identity mapping one-to-one input pixel value-to-output pixel value line. The tone scale function 203 can be constructed from any of the highlight tone scale segments depicted in FIG. 9 in combination with any of the shadow tone scale segments since the variables $x_{ho}$ and $x_{so}$ can be selected independently. It should also be noted that if the variables $\phi_{HC}$ and $\phi_{SC}$ are not set to 0.0, the resultant tone scale function will, in general, not have a continuous slope function at the reference gray point.

A highlight component function constructed with expressions (4), (6), or (13), for the case in which $x_{ho}$ is less than $x_w$, will result in a function that has a montonically increasing instantaneous slope. An example of such a function is depicted as curve 530 in FIG. 10a. While the function indicated by curve 530 satisfies the mapping of input pixel value $x_{ho}$ to output pixel value $x_w$, a tone scale function based on such a function can produce some unnatural looking images. This is mainly due to the fact that the slope of the highlight component function depicted by curve 530 has a slope that is monotonically increasing, not monotonically decreasing, for the input pixel range near the reference gray point. However, a highlight component function can be constructed using the expressions (4), (6), or (13), reflected about the line indicated as line 531 given by (25) for input pixel values greater than or equal to the reference gray point (indicated by point 533).

$$y(x)=(x_w-x_\rho)/(x_{ho}-x_\rho)(x-x_\rho)+x_\rho \qquad (25)$$

Figure 10A:
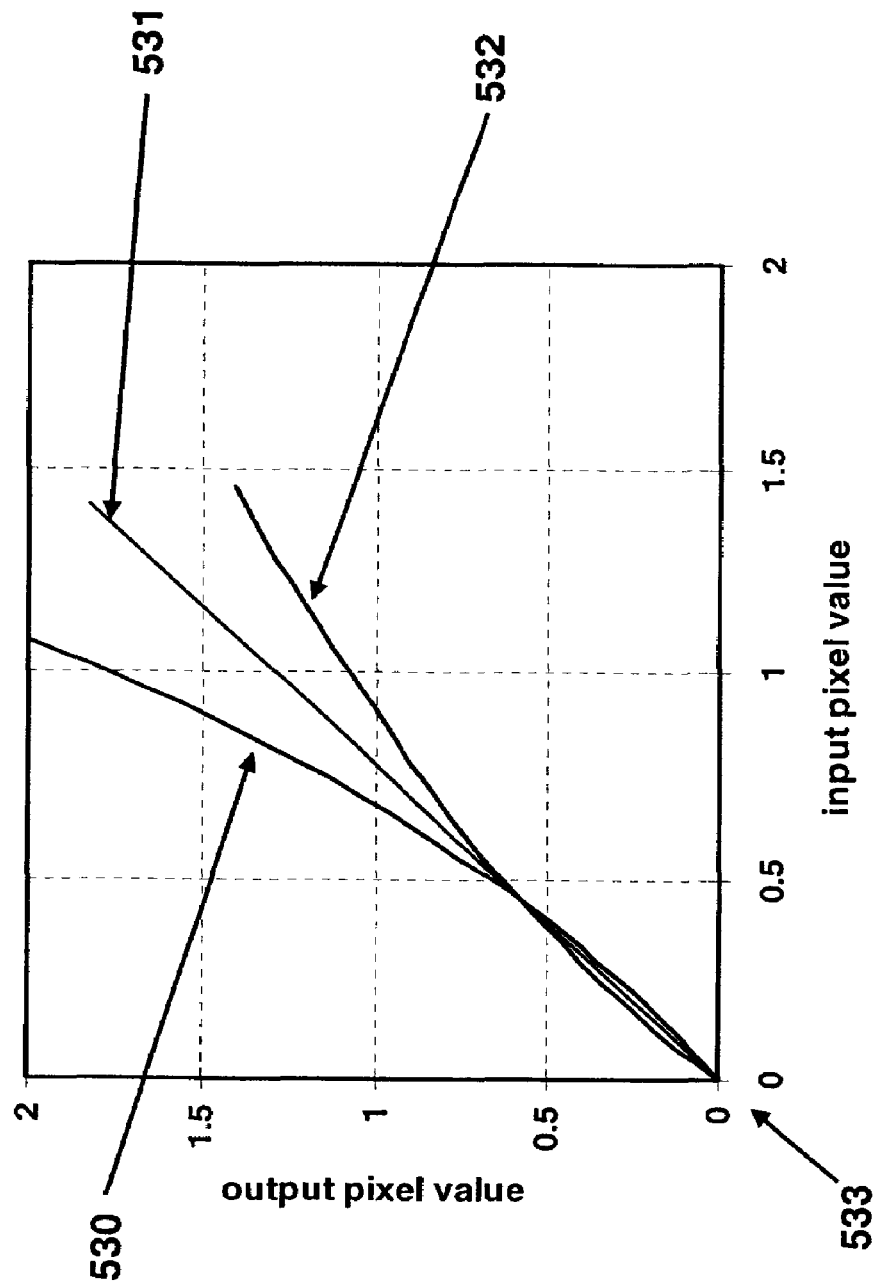
FIG. 10a is a graph illustrating the construction details of an expansive highlight component function.

The function produced by the reflection process, as indicated by curve 532 in FIG. 10a, is a monontonically increasing function with a monotonically decreasing instantaneous slope. The functional form of the expansive highlight component function is calculated by the following steps. First the expression (4), (6), or (13) is solved using the constraint $x_{ho}=x_w$ to determine the numerical constant $\alpha_{h1}$. In the second step, a first rotation transform is applied to a coordinate pair $(x,f(x))$ resulting in a transformed coordinate pair $(u,v)$ as given by (26)

$$u=x\cos(\theta)+f(x)\sin(\theta)$$

$$v=-x\sin(\theta)-f(x)\cos(\theta) \qquad (26)$$

where the angle $\theta$ is given by (27).

$$\theta=\tan^{-1}((x_w-x_\rho)/(x_{ho}-x_\rho)) \qquad (27)$$

The first rotation transform is designed to transform the line described by expression (24) into the x-axis. In the third step the v coordinate is reflected about the new x-axis by taking the negative of the value v coordinate. In the fourth step, a reverse rotation transform is applied to the coordinate pair $(u, -v)$ for the coordinate pair $(u',v')$ as given by (28).

$$u'=u\cos(\theta)+v\sin(\theta)$$

$$v'=x\sin(\theta)-v\cos(\theta) \qquad (28)$$

In the fifth step, the coordinate pair $(u',v')$ defines a highlight component function $g(u)$ and is evaluated for the range of input pixel values.

Figure 10B:
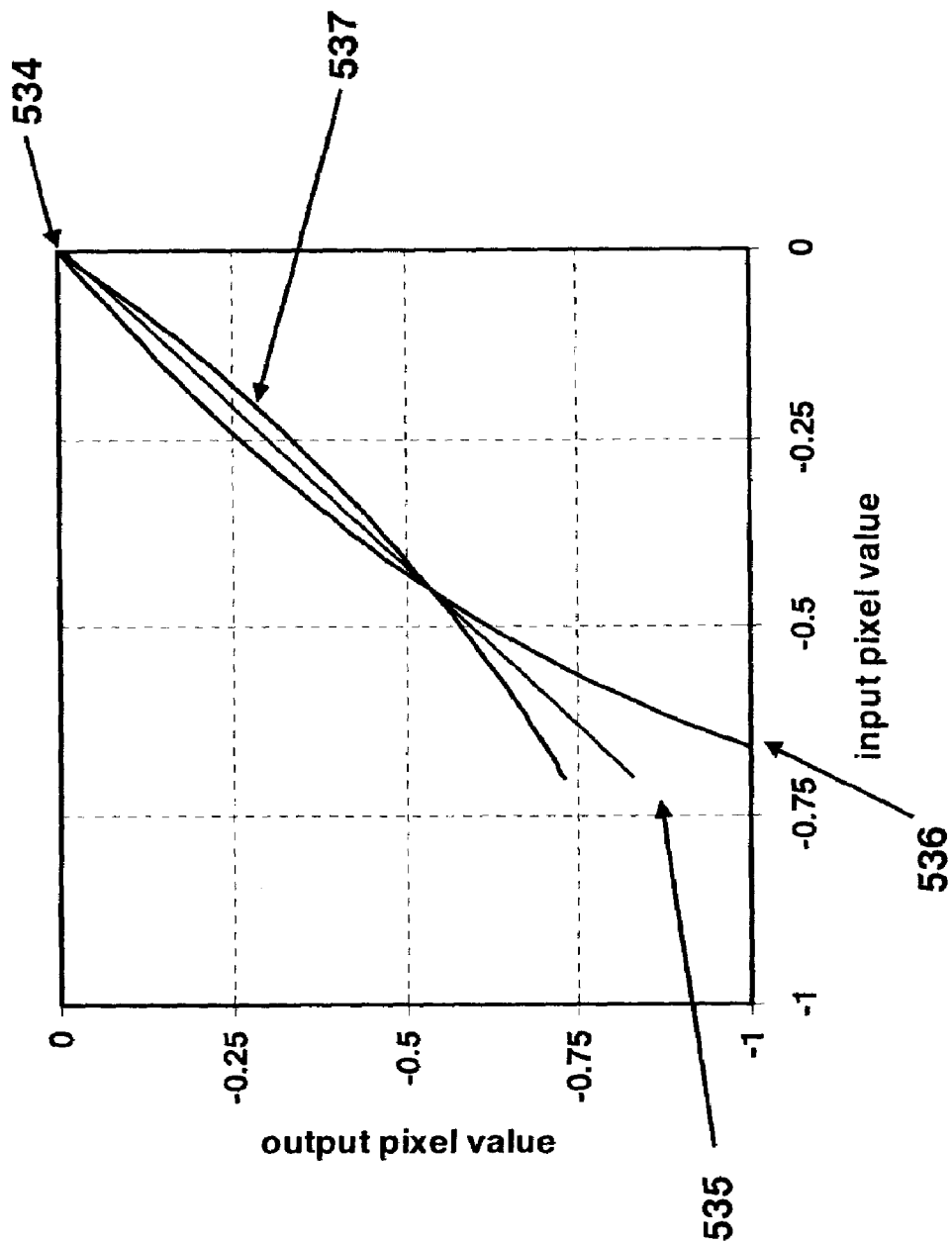
FIG. 10b is a graph illustrating the construction details of an expansive shadow component function.

Referring to FIG. 10b, an expansive shadow component function can be constructed in similar manner as described above for the case in which $x_{so}>x_b$. The shadow component function can be constructed using the function described by (5), (7), or (14), reflected about the line indicated as line 535 given by (29) for input pixel values less than or equal to the reference gray point (indicated by point 534) using the constraint $x_{so}=x_b$ to determine the numerical constant $\alpha_{s1}$.

$$y(x)=(x_b-x_\rho)/(x_{so}-x_\rho)(x-x_\rho)+x_\rho \qquad (29)$$

The curve indicated by 536 depicted in FIG. 10b shows a function using (5), (7), or (14) for a positive numerical constant $\alpha_{s1}$. The corresponding expansive shadow component function produced via the reflection processing steps is indicated by curve 537.

Figure 10C:
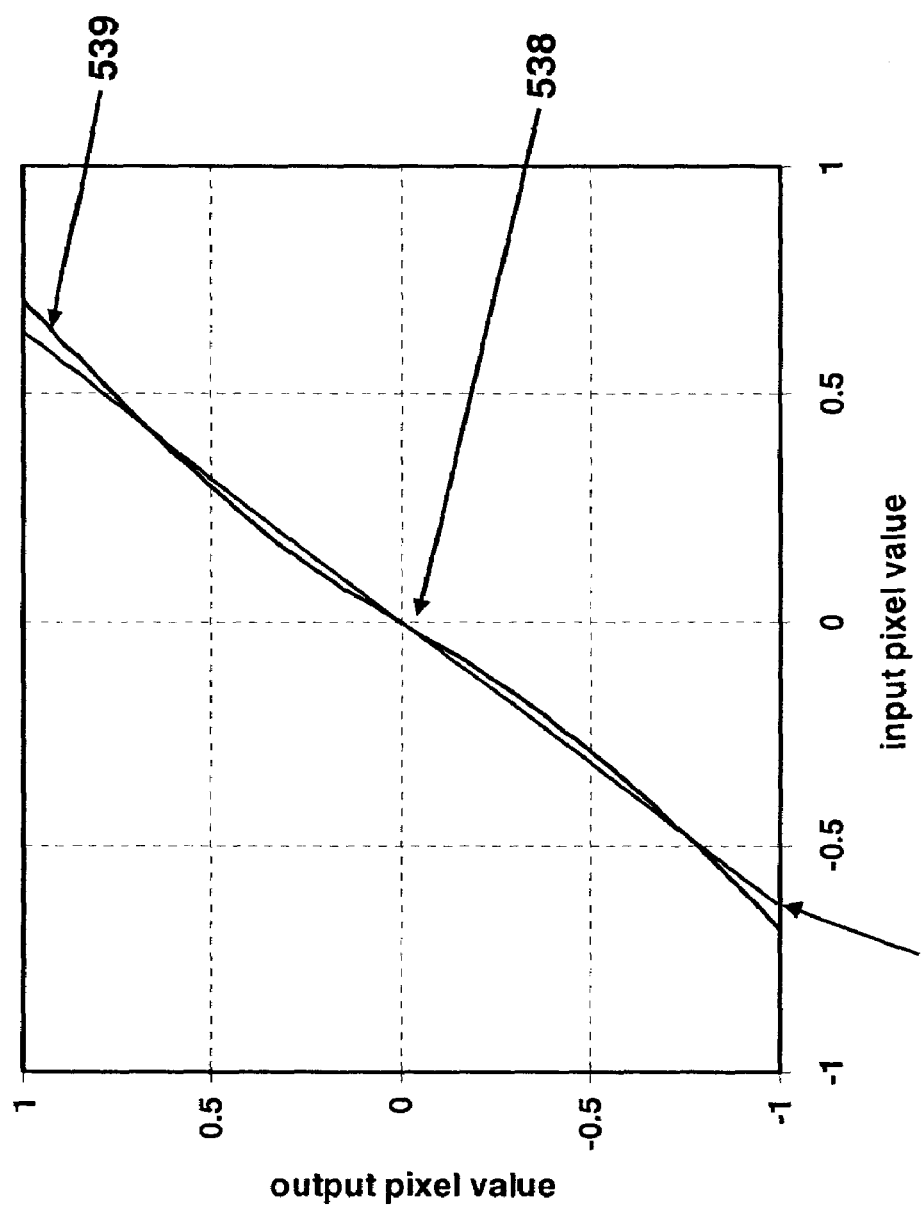
FIG. 10c is a graph of an example of a tone scale function constructed from an expansive highlight and shadow tone scale segment and its corresponding slope function.

A an example graph of a tone scale function constructed from an expansive highlight tone scale segment and an expansive shadow tone scale segment constructed with the component functions described above is shown in FIG. 10c. Since both the highlight and shadow tone scale segments are expansive, the tone scale function, indicated by curve 539, is expansive over the range of input pixel values from $x_{so}$ to $x_{ho}$. The combined linear functions given by expressions (25) and (29) are shown as line 540 with the reference gray point as indicated by point 538. The tone scale function depicted in FIG. 8c as curve 517 is compressive over the range of input pixel values from $x_{so}$ to $x_{ho}$ since both the highlight and shadow tone scale segments used in its construction are compressive component functions. The reference gray point is indicated by point 538.

It is possible to construct a tone scale function from an expansive shadow component function and a compressive highlight component function or from a compressive shadow component function and an expansive highlight component function since the shape of the two tone scale segments are independently controllable. Such a tone scale function is referred to herein as an eclectic function since the two segment are of different shape classification. However, as described above, the two segments must have equal function values at the one input pixel value they have in common, i.e. the reference gray point.

In a preferred embodiment, the expansive highlight component function $f_{h1}(x)$ is constructed using the expression (4) subject the constraints given by (30) and (31).

$$f_{h1}(x_{ho}')=x_w \qquad (30)$$

$$f_{h1}'(x_w)=1.0 \qquad (31)$$

where the variable $x_{ho}'$ is given by the expression (32)

$$f_{h1}(x_{ho}')=(1.0-\eta_H)(x_w-x_{ho})+x_{ho} \qquad (32)$$

and the variable $\eta_H$ represents a control parameter that can be used to select the shape of the function. With these two constraints placed on the function $f_{h1}(x)$, the highlight component function achieves the goal of mapping the prescribed input pixel value $x_{ho}'$ to the prescribed output pixel value $x_w$. The average slope of the function $\gamma_{HE}$ over the interval from $x_\rho$ to $x_{ho}'$ is given by the expression (33)

$$\gamma_{HE}=(x_w-x_\rho)/(x_{ho}'-x_\rho) \qquad (33)$$

which is greater than 1.0 since $x_w$ is greater than $x_{ho}'$. In a similar manner as described above, the variables $\alpha_{h1}$ and $\beta_{h1}$ used in the expression (4) are solved by iterative numerical approximation and stored in a LUT for later recall. The variable $\eta_H$ is preferably set to 0.5. As a further refinement, the highlight component function is combined with a linear function using a control parameter $\phi_{HE}$. The final expression for the expansive highlight component function is given by (34).

$$f_{h1}(x)=(1-\phi_{HE})\alpha_{h1}(1-e^{-(x-x_\rho)/\alpha_{h1}})+\phi_{HE}\gamma_{HE}+x_\rho \qquad (34)$$

Similarly, the expansive shadow component function $f_{s1}(x)$ is constructed using the expression (5) subject the constraints given by (35) and (36).

$$f_{s1}(x_{so}')=x_b \qquad (35)$$

$$f_{s1}'(x_b)=1.0 \qquad (36)$$

where the variable $x_{so}'$ is given by the expression (37)

$$f_{s1}(x_{so}')=(1.0-\eta_s)(x_b-x_{so})+x_{so} \qquad (37)$$

and the variable $\eta_S$ represents a control parameter that can be used to select the shape of the function. With these two constraints placed on the function $f_{s1}(x)$, the shadow component function achieves the goal of mapping the prescribed input pixel value $x_{so}'$ to the prescribed output pixel value $x_b$. The average slope of the function $\gamma_{SE}$ over the interval from $x_{so}'$ to $x_\rho$ is given by the expression (38)

$$\gamma_{SE}=(x_\rho-x_b)/(x_\rho-x_{so}') \qquad (38)$$

which is greater than 1.0 since $x_b$ is less than $x_{so}'$. In a similar manner as described above, the variables $\alpha_{s1}$ and $\beta_{s1}$ used in the expression (5) are solved by iterative numerical approximation and stored in a LUT for later recall. The variable $\eta_s$ is preferably set to 0.5. As a further refinement, the shadow component function is combined with a linear function using a control variable $\phi_{SE}$. The final expression for the expansive shadow component function is given by (39).

$$f_{s1}(x)=(1-\phi_{SE})\alpha_{s1}(1-e^{-(x-x_\rho)/\alpha_{s1}})+\phi_{SE}\gamma_{SE}+x_\rho \qquad (39)$$

Figure 11:
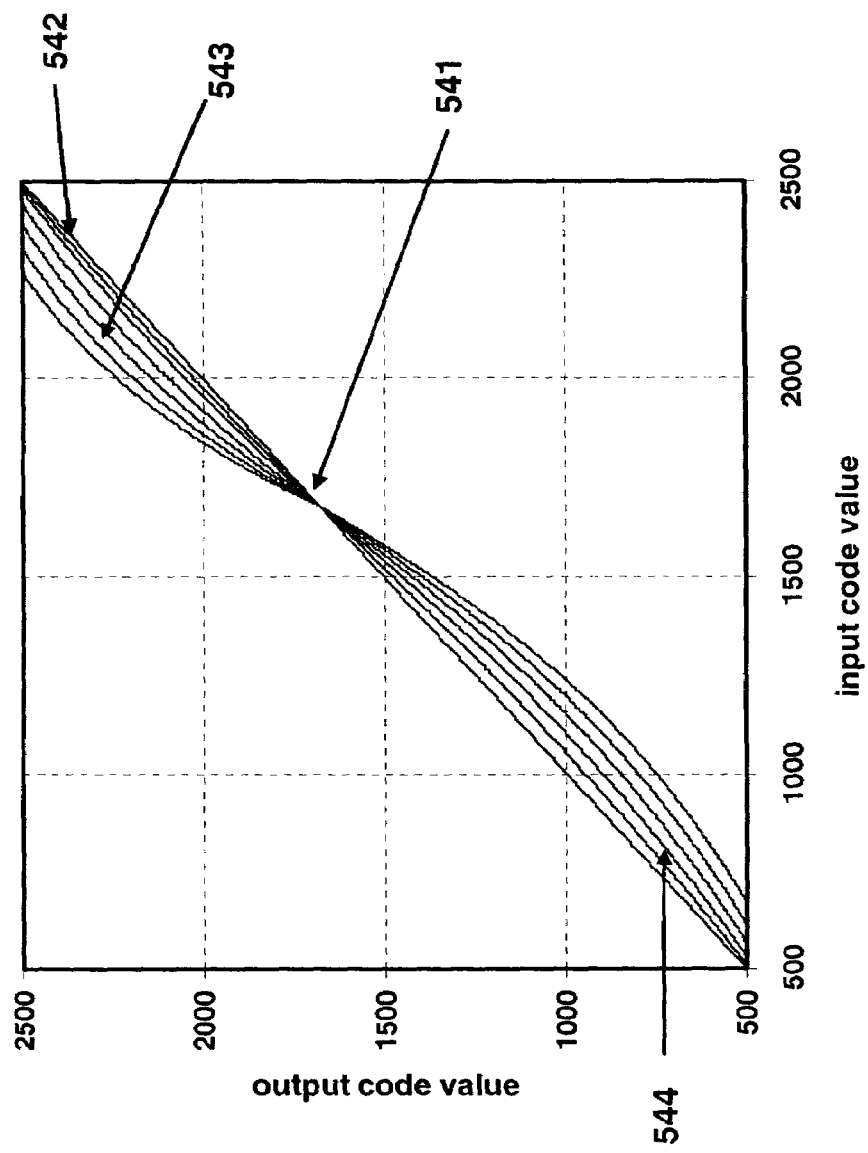
FIG. 11 is a graph illustrating a family of highlight tone scale segments and a family of shadow tone scale segments.

FIG. 11 depicts a family of highlight and shadow tone scale segments each generated from a single expansive component function using expressions (34) and (39) respectively. Point 541 represents the reference gray point $x_\rho$. Line 542 represents the identity mapping one-to-one input pixel value-to-output pixel value line. Curve 543 represents an example a highlight tone scale segment using expression (34). Curve 544 represents an example shadow tone scale segment using expression (39).

An important feature of the tone scale segments constructed with the method of the present invention is the gradual transition in function shape corresponding to a transition from compressive to expansive type functions.

Figure 12A:
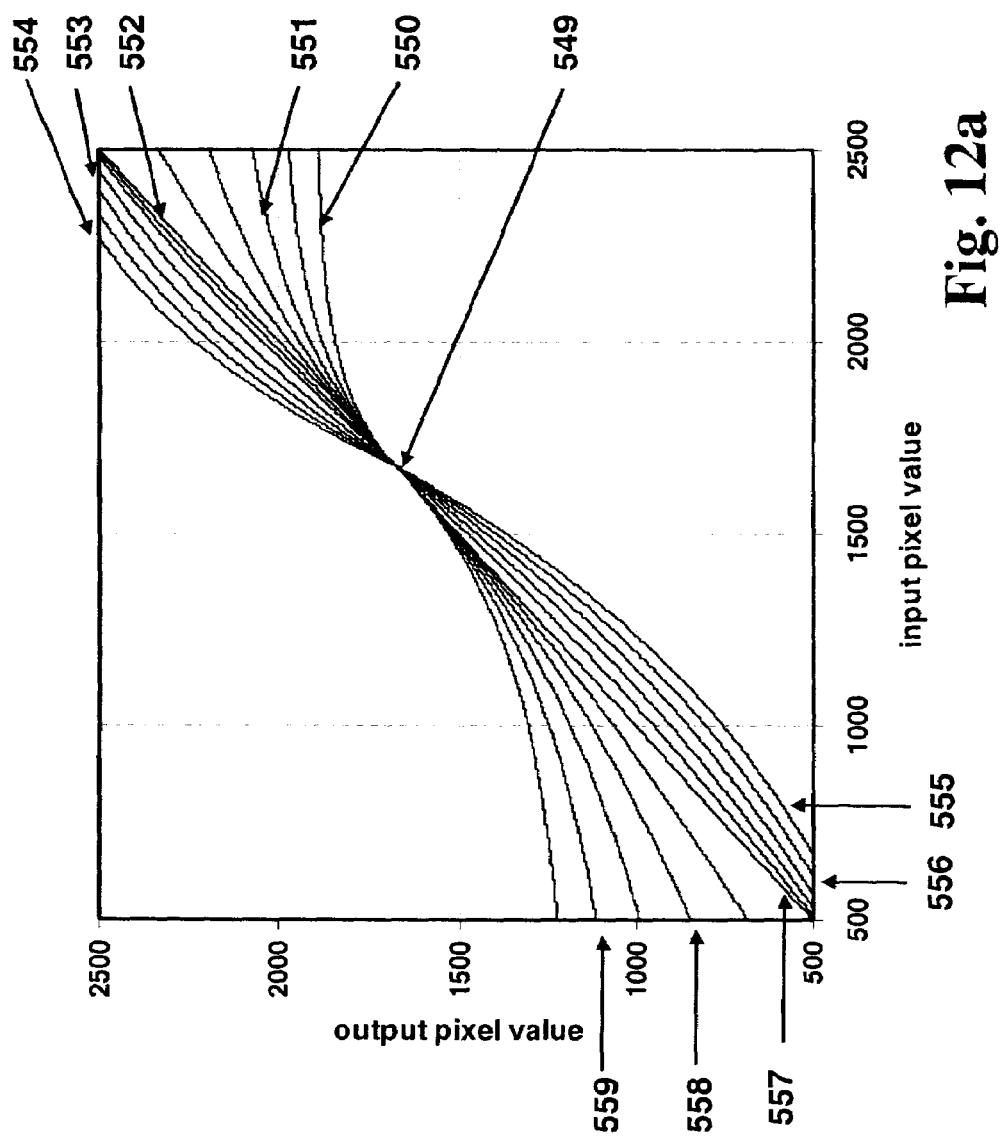
FIG. 12a is a graph illustrating a family of highlight tone scale segments and a family of shadow tone scale segments for both compressive and expansive type functions.

FIG. 12a depicts a family of highlight tone scale segments constructed from a single highlight component function using expression (19) when the component function is compressive and expression (34) when the component function is expansive. Point 549 indicates the reference gray point. Curve 550 indicates a highly compressive highlight component function while curve 551 indicates a mildly highlight component function. The higher the degree of compression, the greater the curvature of the function. When the highlight component function is neither compressive nor expansive, the function assumes the identity mapping one-to-one input-to-output line indicated by curve 552. Curve 553 indicates a mildly expansive highlight component function. Curve 554 indicates a highly expansive highlight component function. The higher the degree of expansion, the greater the curvature of the function. Thus for mildly compressive and mildly expansive highlight component functions, the shape of the function is closer to a straight line. For the compressive highlight component functions used to construct the highlight component segments as shown in FIG. 12a a value of 0.0 was used for the variable $\phi_{HC}$. For the expansive highlight component functions used to construct the highlight component segments shown in FIG. 12a a value of 0.0 was used for the variable $\phi_{HE}$. It should be noted that the value of the $\phi_{HC}$ variable used in expression (19) can be selected independent of the value of the $\phi_{HE}$ variable used in expression (34).

The shape of the shadow tone scale segments also have a graceful transition between compressive and expansive function types. FIG. 12a also depicts a family of shadow tone scale segments constructed from a single shadow component function using expression (22) when the component function is compressive and expression (39) when the component function is expansive. Curve 555 indicates a highly compressive shadow component function while curve 556 indicates a mildly shadow component function. The higher the degree of compression, the greater the curvature of the function. When the shadow component function is neither compressive nor expansive, the function assumes the identity mapping one-to-one input-to-output line indicated by line 557. Curve 558 indicates a mildly expansive shadow component function. Curve 559 indicates a highly expansive shadow component function. The higher the degree of expansion, the greater the curvature of the function. Thus for mildly compressive and mildly expansive shadow component functions, the shape of the function is closer to a straight line. For the compressive shadow component functions used to construct the shadow component segments as shown in FIG. 12a a value of 0.0 was used for the variable $\phi_{SC}$. For the expansive shadow component functions used to construct the shadow component segments shown in FIG. 12a a value of 0.0 was used for the variable $\phi_{SE}$. It should be noted that the value of the $\phi_{SC}$ variable used in expression (22) can be selected independent of the value of the $\phi_{SE}$ variable used in expression (39).

Figure 12B:
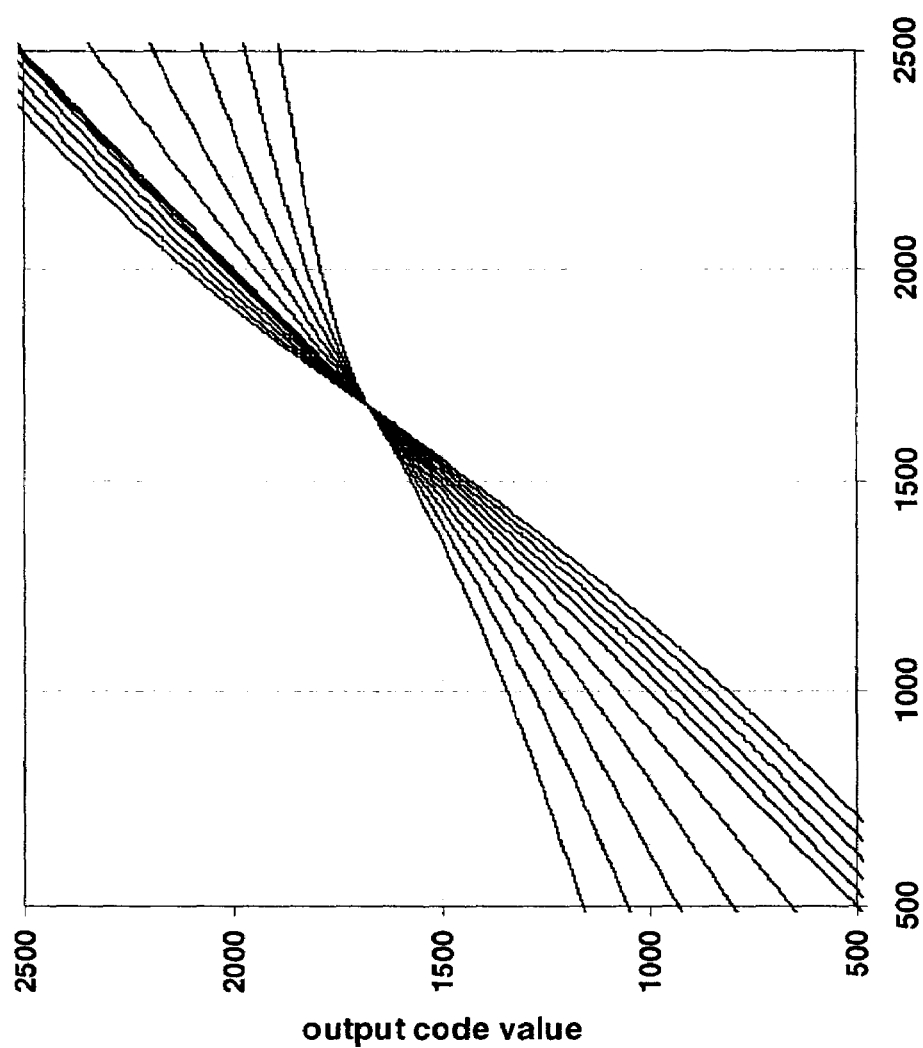
FIG. 12b is another graph illustrating a family of highlight tone scale segments and a family of shadow tone scale segments for both compressive and expansive type functions.

FIG. 12b depicts a similar family of highlight and shadow tone scale segments constructed using expressions (19), (34), (22) and (39) with the values of the variables $\phi_{HC}$, $\phi_{HE}$, $\phi_{SC}$, and $\phi_{SE}$ all set to a value of 0.5. As can be seen from the curves depicted in FIG. 12b, the tone scale segments constructed with the method of the present invention make a gradual transition in function shape for a corresponding transition from compressive to expansive type functions.

In another alternative embodiment for a compressive highlight component function, the variable $\phi_h$ is made a function of the degree of compression, i.e. the ratio of $(x_w-x_\rho)$ to $(x_{ho}-x_\rho)$. The expression for the highlight component function $f_{h1}(x)$ is given by (13) where the slope variable $\phi_h$ in expression (13) is given by (40)

$$\phi_h = 1.0 - \eta_h(1.0 - (x_w/x_{ho})) \tag{40}$$

and the variable $\eta_h$ controls the shape of the highlight component function. The variable $\eta_h$ can be selected. When the variable $\eta_h$ is set to 1.0, the highlight component function assumes the equation of a line given as expression (21). When the variable $\eta_h$ is set to 0.0, the highlight component function assumes the equation of the exponential function given as expression (13). Similarly, for a compressive shadow component function, the variable ($\phi_s$ is made a function of the degree of compression, i.e. the ratio of $(x_\rho - x_b)$ to $(x_\rho - x_{so})$. The expression for the shadow component function $f_{s1}(x)$ is given by (14) where the slope variable $\phi_s$ in expression (14) is given by (41)

$$\phi_s = 1.0 - \eta_s(1.0 - (x_b/x_{so})) \tag{41}$$

and the variable $\eta_s$ controls the shape of the shadow component function. When the variable $\eta_s$ is set to 1.0, the shadow component function assumes the equation of a line given as expression (24). When the variable $\eta_s$ is set to 0.0, the shadow component function assumes the equation of the exponential function given as expression (14).

The highlight tone scale segment can be constructed using more than one highlight component function. In another embodiment, a second highlight component function is constructed using the same functional form as expression (6) constrained to pass through the specified coordinate point defined by an abscissa value $x_{he}$ that results in a function value $x_{we}$ as given by (42).

$$x_{we} = \alpha_{h2}(1 - e^{-(x_{he} - x_\rho)/\alpha_{h2}}) + x_\rho \tag{42}$$

This constraint achieves an extreme highlight white point mapping objective relating to the brightest part of the processed digital image. For the second highlight component function, the white point value $x_{we}$ is predetermined based on the pixel value that is mapped by the rendering function R(x) to correspond to a white paper density of approximately 0.08, i.e. the minimum paper achievable paper density. The variable $\alpha_{h2}$ can be solved using the iterative numerical solution described above. The second highlight component function is described by expression (43).

$$f_{h2}(x) = \alpha_{h2}(1 - e^{-(x - x_\rho)/\alpha_{h2}}) + x_\rho \tag{43}$$

The highlight tone scale segment $F_H(x)$ is constructed by combining the first highlight component function given by expression (19) with the second highlight component function given by expression (43). $F_H(x)$ is given by expression (44)

$$F_H(x) = f_{h1}(x) \text{ for } x_\rho <= x <= x_{hc}$$

$$F_H(x) = \omega_h(x) f_{h1}(x) + (1 - \omega_h(x)) f_{h2}(x) \text{ for } x_{hc} < x <= x_{he}$$

$$F_H(x) = f_{h2}(x) \text{ for } x_{he} < x \tag{44}$$

where the function $\omega_h(x)$ represents a blending function of the two component functions and is given by expression (45).

$$\omega_h(x) = (x - x_{hc})/(x_{he} - x_{hc}) \tag{45}$$

The highlight tone scale segment so constructed consists of three input pixel domains. The first domain extends from the reference gray point $x_\rho$ to a point defined by the variable $x_{hc}$. This first domain is constructed entirely from the first highlight component function $f_{h1}(x)$. The second domain is constructed using a blend of the first and second highlight component functions and extends from point $x_{hc}$ to the extreme highlight point $x_{he}$. The third shadow domain is constructed for the region for input pixel values greater than the value of $x_{he}$. As input pixel values, denoted here by the variable x, approach $x_{he}$, the highlight tone scale segment approaches the value of the second highlight component function $f_{h2}(x)$. Highlight tone scale segments constructed using expressions (44) can produce an inflection point in the function shape for some input pixel value x within the range from $x_\rho$ to $x_{he}$. That is, the slope of the highlight tone scale segment has a local minimum within the range from $x_\rho$ to $x_{he}$. Thus the slope of the highlight tone scale segment produced with this embodiment is not necessarily a monotonically decreasing function over the range from $x_\rho$ to $x_{he}$ even though each component function is a monotonically decreasing function. However, slope of the highlight tone scale segment produced with this embodiment is a monotonically decreasing function over the range from $x_\rho$ to $x_{hc}$, i.e. the range of input pixel values that includes the intersection of the highlight and shadow tone scale segments. It is also possible, for this embodiment of the construction method, that the slope of the highlight tone scale segment be greater than 1.0 for the input pixel value domain in the vicinity of $x_{he}$. This feature tends to maintain the appearance of specular highlights as bright spots even though the highlight tone scale segment is a compressive function, i.e. the range of input pixel values ($x_\rho$ to $x_{he}$) is larger than the range of output pixel values ($x_\rho$ to $x_{we}$).

In similar fashion, the shadow tone scale segment can be constructed using more than one shadow component function. In another embodiment, a second shadow component function is constructed using the same functional form as expression (7) constrained to pass through the a specified coordinate point defined by an abscissa value $x_{se}$ that results in a function value $x_{be}$ as given by (46).

$$x_{be} = \alpha_{s2}(1 - e^{-(x_{se} - x_\rho)/\alpha_{s2}}) + x_\rho \tag{46}$$

This constraint achieves an extreme shadow black point mapping objective relating to the darkest part of the processed digital image. For the second shadow component function, the black point value $x_{be}$ is predetermined based on the pixel value that is mapped by the rendering function R(x) to correspond to a black paper density of approximately 2.3, i.e. the maximum paper achievable paper density. The variable $\alpha_{s2}$ can be solved using the iterative numerical solution described above. The second shadow component function is described by expression (47).

$$f_{s2}(x) = \alpha_{s2}(1 - e^{-(x - x_\rho)/\alpha_{s2}}) + x_\rho \tag{47}$$

The shadow tone scale segment $F_s(x)$ is constructed by combining the first shadow component function given by expression (22) with the second shadow component function given by expression (47). $F_s(x)$ is given by expression (48)

$$F_s(x) = f_{s1}(x) \text{ for } x <= x <= x_{sc}$$

$$F_s(x) = \omega_s(x) f_{s1}(x) + (1 - \omega_s(x)) f_{s2}(x) \text{ for } x_{sc} < x <= x_{se}$$

$$F_s(x) = f_{s2}(x) \text{ for } x_{se} < x \tag{48}$$

where the function $\omega_s(x)$ represents a blending function of the two component functions and is given by expression (49).

$$\omega_s(x) = (x - x_{sc})/(x_{se} - x_{sc}) \tag{49}$$

The shadow tone scale segment so constructed consists of three input pixel domains. The first domain extends from a point defined by the variable $x_{sc}$ to the reference gray point $x_\rho$. This first shadow domain is constructed entirely from the first shadow component function $f_{s1}(x)$. The second shadow domain is constructed using a blend of the first and second shadow component functions and extends from the extreme shadow point $x_{se}$ to the point $x_{sc}$. The third shadow domain is constructed for the region for input pixel values less than the value of $x_{se}$. As decreasing input pixel values, denoted here by the variable x, approach $x_{se}$, the shadow tone scale segment approaches the value of the second shadow component function $f_{s2}(x)$. Shadow tone scale segments constructed using expressions (48) can produce an inflection point in the function shape for some input pixel value x within the range from $x_{se}$ to $x_\rho$. That is, the slope of the shadow tone scale segment has a local minimum within the range from $x_{se}$ to $x_\rho$. Thus the slope of the shadow tone scale segment produced with this embodiment is not a monotonically increasing function over the range from $x_{se}$ to $x_\rho$ even though each component function is a monotonically increasing function. However, slope of the shadow tone scale segment produced with this embodiment is a monotonically increasing function over the range from $x_{sc}$ to $x_\rho$, i.e. the range of input pixel values that includes the intersection of the highlight and shadow tone scale segments. It is also possible for this embodiment of the construction method that the slope of the shadow tone scale segment be greater than 1.0 for the input pixel value domain in the vicinity of $x_{se}$. This feature tends to maintain the appearance of deep shadows as very dark regions even though the shadow tone scale segment is a compressive function, i.e. the range of input pixel values ($x_{se}$ to $x_\rho$) is larger than the range of output pixel values ($x_{be}$ to $x_\rho$).

Figure 13A:
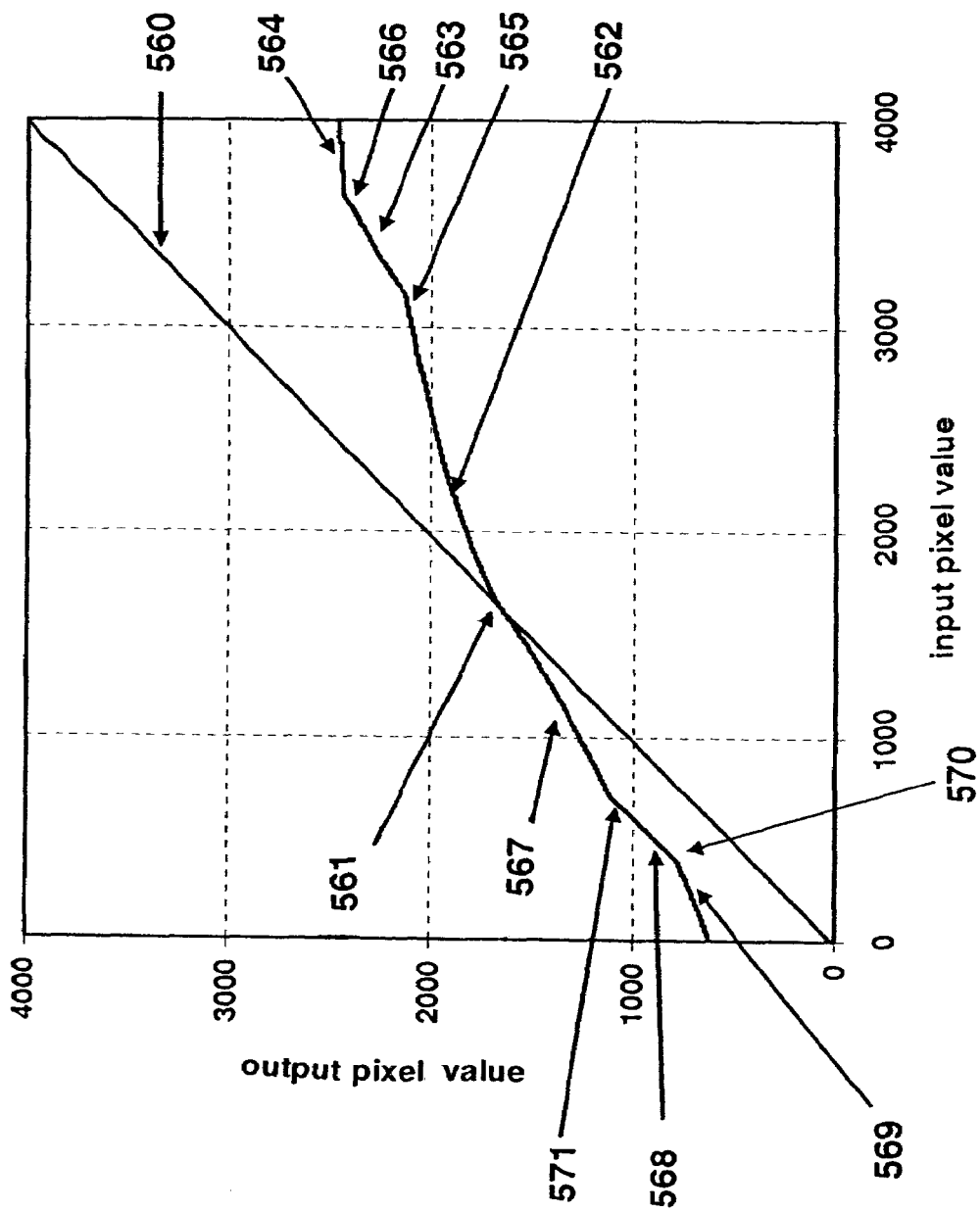
FIG. 13a is a graph illustrating an example of a tone scale function wherein the highlight tone scale segment and the shadow tone scale segment are each constructed with two component functions.

An example graph of a tone scale function 203 constructed using a highlight and tone scale segment each having been constructed from two component functions is shown in FIG. 13a. The identity mapping one-to-one input pixel value-to-output pixel value line is indicated by line 560 and the reference gray point is indicated by point 561. The first, second, and third input pixel domains described above for the highlight tone scale segment are indicated by domains 562, 563, and 564 respectively. The abscissa and ordinate values for point 565 are the variables $x_{he}$ and $x_{we}$ respectively. The abscissa value for point 566 is the variable $x_{hc}$. The first, second, and third input pixel domains described above for the shadow tone scale segment are indicated by domains 567, 568, and 569 respectively. The abscissa and ordinate values for point 570 are the variables $x_{se}$ and $x_{be}$ respectively. The abscissa value for point 571 is the variable $x_{sc}$.

The third highlight domain indicated by domain 564 relates to pixels with values greater than the variable $x_{he}$. As will be described in more detail below, this domain of input pixel values relates to the brightest 0.1% pixels. Therefore, the shape of the third highlight domain really only affects a very small portion of the image area. The same argument can be made for the third shadow domain indicated by domain 569 relating to pixels with values less than the variable $x_{se}$. Another approach for determining the shape of the third highlight domain that would produce acceptable results is to use the instantaneous slope of the tone scale function at the point 566 to project a straight line from point 566. Similarly, the instantaneous slope of the tone scale function at the point 570 can be used to project a straight line from point 570 for the third shadow domain.

Figure 13B:
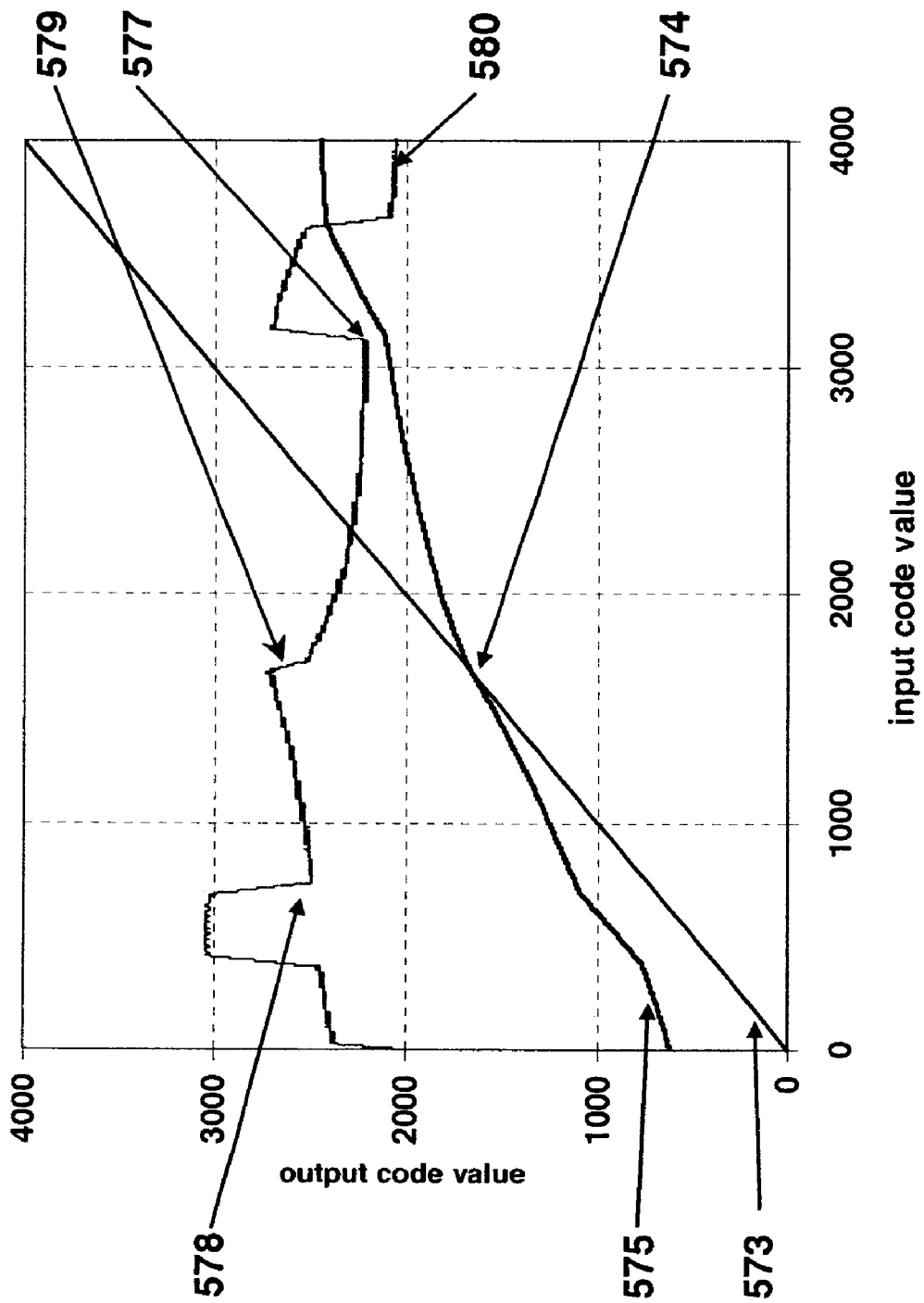
FIG. 13b is a graph illustrating the example tone scale function depicted in FIG. 12a and the corresponding slope function.

FIG. 13b shows the tone scale function 203 and its corresponding slope function. The identity mapping one-to-one input pixel value-to-output pixel value line is indicated by line 573 and the reference gray point is indicated by point 574. The tone scale function 203 shown in FIG. 13a is shown in FIG. 13b as curve 575. Several features of the slope function shown in FIG. 13b are noteworthy. Point 579 indicates the slope function at the abscissa value equal to the reference gray point. The slope function is nearly discontinuous at the reference gray point and achieves a local maximum value at the reference gray point. The tone scale function 203 depicted in FIGS. 13a and 13b therefore has an inflection point at the abscissa value equal to the reference gray point since the corresponding slope function has a local maximum at the reference gray point. Point 577 indicates a local minimum of the slope function within the input pixel domain corresponding to the highlight tone scale segment. Thus the tone scale function 203 constructed with two highlight component functions can have an inflection point within the input pixel domain of the highlight tone scale segment. Similarly, point 578 indicates a local minimum of the slope function within the input pixel domain corresponding to the shadow tone scale segment. Thus the tone scale function 203 constructed with two shadow component functions can have an inflection point within the input pixel domain of the shadow tone scale segment.

Figure 13C:
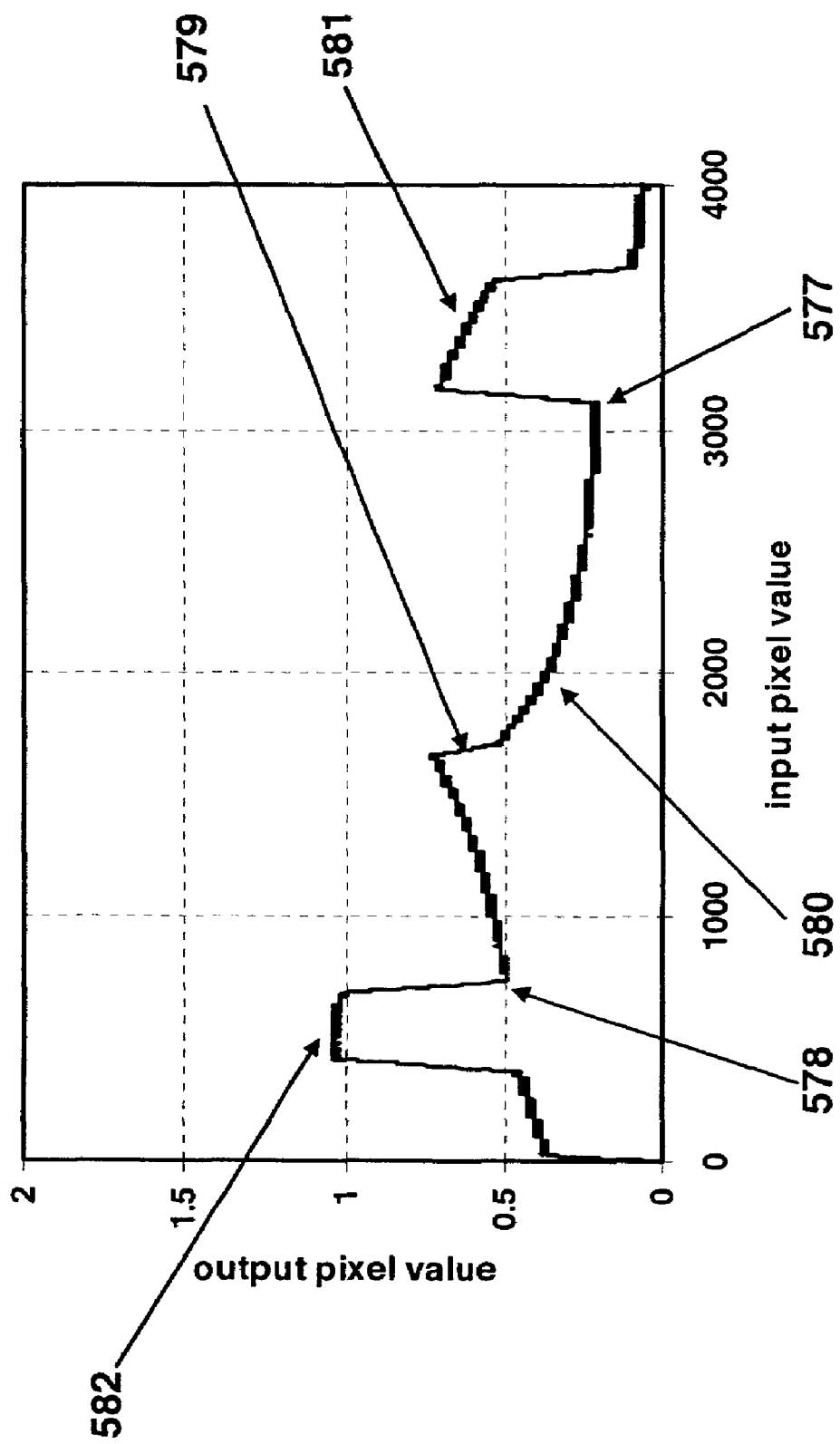
FIG. 13c is a graph illustrating the details of the corresponding slope function depicted if FIG. 12b.

The slope function shown in FIG. 13b (indicated by curve 580) is shown in isolation in FIG. 13c as indicated by curve 580 with the scale of the graph indicating the magnitude for the slope function. Thus it can be seen that the value of the slope function, which indicates the instantaneous slope of the tone scale function, is never negative, i.e. the tone scale function is a monotonic function. The tone scale function shown in FIGS. 13a and 13b is compressive for both the highlight and shadow tone scale segments. Thus the average value of the corresponding slope function depicted in FIG. 13c is less than 1.0. The inflection points for the highlight and shadow tone scale segments are indicated as points 577 and 578 respectively. (These points are also indicated in FIG. 13b.) The slope function achieves a relatively high value in the extreme highlight domain indicated by domain 581. The magnitude of the slope function in the domain 581 is about the same as the magnitude of the slope function for the mid-tone domain near the indicated point 579. The extreme shadow domain indicated by domain 582 achieves a slope which is higher even higher in magnitude. Therefore, the tone scale function depicted in FIGS. 13a and 13b achieves a relatively high slope at the reference gray point and within the extreme highlight and extreme shadow domains as well.

Referring to FIG. 4, the pixels of the source digital image, i.e. the input digital image to the tone scale module 330, can be used to determine the variables $x_{ho}$ and $x_{so}$ and thus determine the shape of the tone scale function. The analysis image generator 250 receives the source digital image and produces an analysis digital image 201 by applying a low-pass spatial filter and performing a sampling operation. The result is a lower spatial resolution version of the source digital image that has fewer pixels representing the same image content. Typical spatial resolutions for the analysis digital image 201 is approximately 64 by 96 pixels. The analysis digital image is also converted to be in a luminance-chrominance representation using expression (1).

Figure 14:
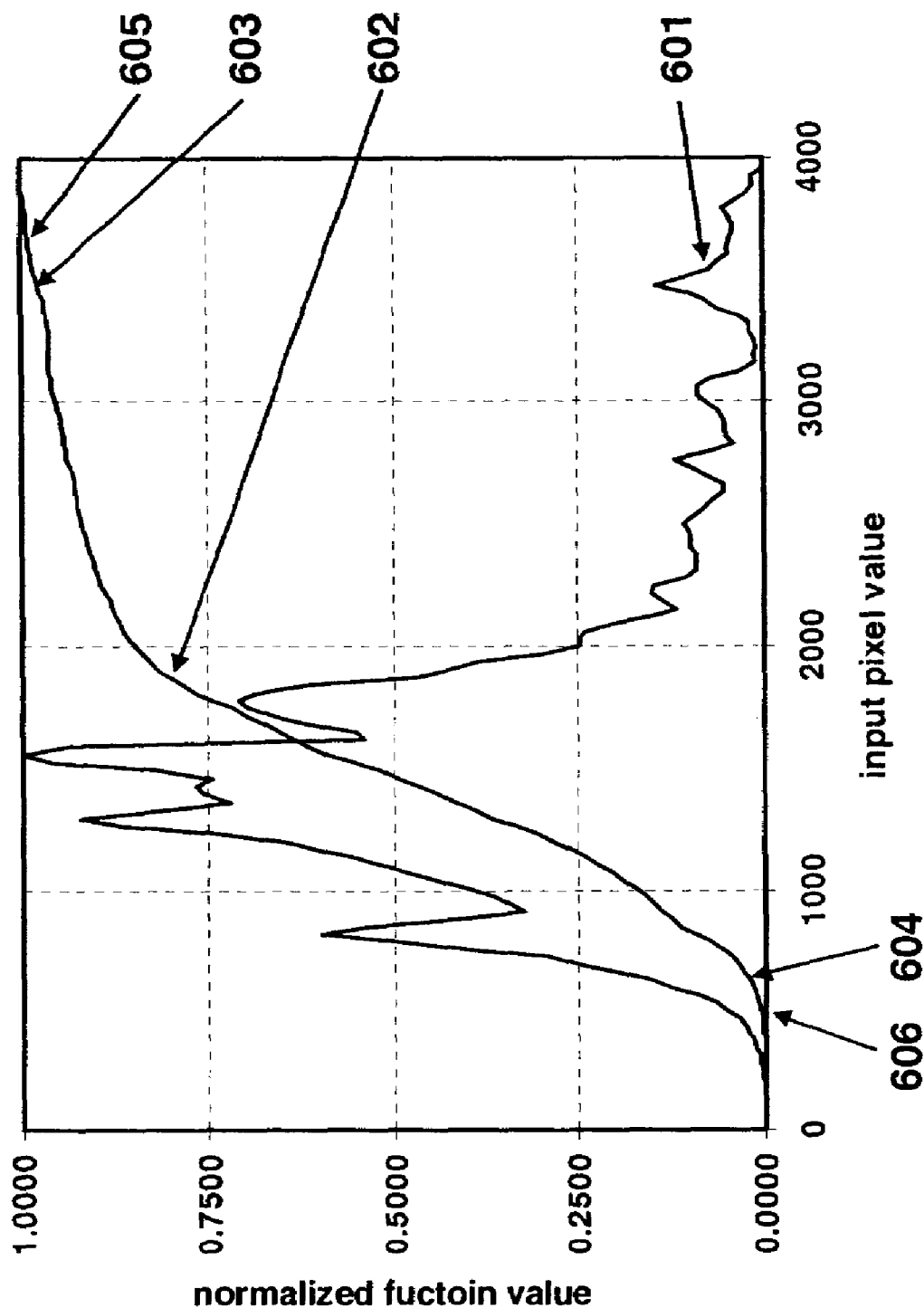
FIG. 14 is a graph illustrating an example image histogram function and its corresponding cumulative histogram function.

The tone scale function generator 230 calculates the tone scale function 203 by analyzing the pixels of the analysis digital image 201. A pixel histogram function, i.e. a frequency of occurrence function, is calculated from the pixels of the luminance digital image channel of the analysis digital image 201. A cumulative histogram function is calculated from the pixel histogram function by integrating the values of the pixel histogram as a function of pixel value. FIG. 14 shows a graph of a example histogram function indicated by curve 601 and its corresponding cumulative histogram function indicated by curve 602. The cumulative histogram function is scaled between 0.0 and 1.0 and relates to the percentage area of the digital image with 1.0 corresponding to 100 percent of image area. The ordinate value of the cumulative histogram function relates to a given percentage image area Z. The corresponding abscissa value relates to the pixel value P for which the percentage of pixels in the image that have values less than P is given by Z. The 99.0% cumulative histogram function value is used to determine the value of the highlight point, variable $x_{ho}$. The 1.0% cumulative histogram function value is used to determine the value of the shadow point, variable $x_{so}$. The values for the variables $x_{ho}$ and $x_{so}$ are indicated as points 603 and 604 respectively on the graph shown in FIG. 14.

For the embodiment described above for which two highlight component functions are used to construct the highlight tone scale segment, the pixels of the source digital image can also be used to set the value of variable $x_{he}$. The 99.9% cumulative histogram function value is used to determine the value of the extreme highlight point, variable $x_{he}$. Similarly, for the embodiment described above for which two shadow component functions are used to the construct the shadow tone scale segment, the extreme shadow point variable $x_{se}$ is determined using the 0.1% cumulative histogram function value. The values for the variables $x_{he}$ and $x_{se}$ are indicated as points 605 and 606 respectively on the graph shown in FIG. 14. Those skilled in the art will recognize that the present invention can be used with cumulative histogram percentile values other than the above mentioned values for the variables $x_{so}$, $x_{ho}$, $x_{he}$, and $x_{se}$ and still derive the benefits of the present invention. For optimum results, the variables $x_{so}$ and $x_{ho}$ should relate to relatively dark and light scene objects respectively and the variables $x_{se}$ and $x_{he}$ should relate to extremely dark and light scene objects respectively.

While the present invention uses the cumulative histogram function of image pixel values to determine variables $x_{so}$, $x_{ho}$, $x_{he}$, and $x_{se}$, masked cumulative histogram functions of image pixel values can also be used. For example, a spatial activity filter can be operated on the digital image to be processed and compared to a threshold value to produce an image mask. The image mask represents pixels that are included in the masked cumulative histogram function.

Other functions than the exponential functions described above can be used to generate the highlight and shadow component functions. For example, an integral-of a-Gaussian function can be used to construct the highlight and shadow component functions. A Gaussian function $\gamma(x,\sigma)$ with a control parameter $\sigma$ is given by (50).

$$\gamma(u,\sigma) = e^{-(u-x_p)^2/2\sigma^2} \tag{50}$$

The highlight component function $f_{h1}(x)$ is calculated as (51)

$$f_{h1}(x) = (x_{we} - x_p) \frac{\int_{x_p}^{x} \gamma(u, \sigma_H) du}{\int_{x_p}^{x_{MAX}} \gamma(u, \sigma_H) du} + x_p \tag{51}$$

where x is defined for $x >= x_p$ and the shadow component function $f_{s1}(x)$ is calculated given (52) where x is define for $x <= x_p$.

$$f_{s1}(x) = (x_p - x_{be}) \frac{\int_{x_{MIN}}^{x} \gamma(u, \sigma_S) du}{\int_{x_{MIN}}^{x_p} \gamma(u, \sigma_S) du} + x_{be} \tag{52}$$

The integration procedure is performed using discrete values for the variable x to generate a look-up-table where $x_{MIN}$ and $x_{MAX}$ represent the minimum and maximum possible pixel values respectively. The variables $\sigma_H$ and $\sigma_S$ represent control parameters that determine the shape of the component functions. The variables $\sigma_H$ and $\sigma_S$ can be determined using expressions (53) and (54) respectively.

$$\sigma_H = 3.0(x_{he} - x_p) \tag{53}$$

$$\sigma_S = 3.0(x_p - x_{se}) \tag{54}$$

In another embodiment, a sigmoid shaped function is used to construct the highlight and shadow component functions. The highlight component $f_{h1}(x)$ is given by (55)

$$f_{h1}(x) = (x_{we} - x_p)\left(\frac{2}{1 + e^{-xK_H}} - 1\right) + x_p \tag{55}$$

and the shadow component $f_{s1}(x)$ is given by (56).

$$f_{s1}(x) = (x_p - x_{be})\left(\frac{2}{1 + e^{-xK_S}} - 1\right) + x_{be} \tag{56}$$

The variables $K_H$ and $K_S$ can be independently selected to change the shape of the highlight and shadow component functions respectively. The variable $K_H$ is determined such the $f_{h1}(x_{ho}) = x_w$. The variable $K_S$ is determined such the $f_{s1}(x_{so}) = x_b$.

It should be noted that many other functions in the general class of sigmoid functions can be used to generate the highlight and shadow component functions. A sigmoid shaped function refers herein to a function with the following properties: the first derivative of the function approaches a value of zero at the minimum and maximum values of the input domain, the function does not have a zero first derivative value between the minimum and maximum values of the input domain, and the function is either monotonically increasing or decreasing over the input domain. An important aspect of using a sigmoid shaped function for the highlight and shadow component functions is the independence of the two component functions. Therefore, a first sigmoid shaped function can be used for the highlight component function and a second sigmoid shaped function for the shadow component function. Although the sigmoid shaped function for the two component functions can have the same functional form, the first and second sigmoid shaped functions must have different control parameters otherwise the two sigmoid shaped functions would constitute a single sigmoid function. It will also be appreciated that tone scale functions constructed with two sigmoid shaped functions as described above will have a monotonically increasing slope for input pixel values below the reference gray point and have a monotonically decreasing slope for input pixel values above the reference gray point.

An important feature of the present invention is the use of two tone scale segments for constructing a tone scale function. Another important feature is the use of mathematical functions for constructing the two tone scale segments. In particular, a different mathematical function is used for the highlight tone scale segment than for the shadow tone scale segment. In the context of the present invention, different mathematical functions can share the same mathematical equation, i.e. the same mathematical combination of variables, however, the values of the control variables for the different mathematical functions must be different. For example, the highlight and shadow component function of expressions (13) and (14) respectively share the same mathematical equation but have different values for the control variable $\alpha$ denoted by $\alpha_{h1}$ and $\alpha_{s1}$ and are therefore considered different mathematical functions.

When the expressions (19) and (22) are used to construct the highlight and shadow tone scale segments respectively with just a single component function, the $\phi_h$ and $\phi_s$ variables can be selected independently. When the $\phi_h$ variable is selected to be 1.0, the highlight tone scale segment is described by a linear function. Similarly, when the $\phi_s$ variable is selected to be 1.0, the shadow tone scale segment is described by a linear function. The present invention preferably selects the values of the $\phi_h$ and $\phi_s$ variables to be 0.5. However, for some digital imaging system applications and depending on individual people's preferences, the values of the $\phi_h$ and $\phi_s$ variables can be selected to be 1.0 and yield very good results. This is largely due to the combination of the image independent sigmoid shaped rendering function R(x) employed by the rendering module 340 with the image dependent tone scale function 203 employed by the tone scale module 330. The use of the sigmoid shaped rendering function R(x) provides the graceful roll-off of pixel values at both extremes (light and dark extremes) that yields a photographically acceptable appearance to the processed digital images. With the variables $\phi_h$ and $\phi_s$ set to values less than 1.0, the constructed tone scale function 203 also achieves the property of a graceful roll-off of pixel values at both extremes. Therefore, another important feature of the present invention is the combination use of a sigmoid shaped image independent function with an image dependent two segment tone scale function.

It should be noted that when the variables $\phi_h$ and $\phi_s$ are both set to less than 1.0, the overall shape of the tone scale function is sigmoid "S" shaped. Therefore when the sigmoid shaped image independent function R(x) is used in conjunction with the sigmoid shaped image dependent tone scale function 203, the cascading of the two sigmoid shaped functions provides a reinforcing effect of the function property of having a graceful roll-off of pixel values at both extremes.

Although the above description of the construction of the tone scale function has treated the underlying functions as continuous mathematical entities, those skilled in the art will recognize that for digital imaging applications, any function must be approximated by discrete values. Therefore, when implemented in a digital computer, the tone scale function 203 is actually represented by a collection of discrete values. The present invention uses a look-up-table to implement and store the tone scale function. To within the limits of a digital representation will allow, the tone scale function 203 is continuous. However, the tone scale function 203 can also be represented as a series of line segments wherein the points defining the line segments are determined using the mathematical functions described above. The main advantage of the method of using a series of line segment saves computation resources by using a linear interpolation method to generate the tone scale function points of the line segments.

Referring to FIG. 3 and FIG. 4, the tone scale function generator 230 can accept user input selections 231 in the generation of the tone scale function 203. For example a user of the system shown in FIG. 1 can view possible selections and/or control parameters on the monitor device 50 and indicate selections using the input control device 60 such as a keyboard or mouse pointing device. When used in this manual user mode, a highlight control parameter and a shadow control parameter are used to change the shape of the component functions that are used to generate the highlight tone scale segment and shadow tone scale segment respectively.

In a preferred embodiment for this manual mode of operation, expressions (44) and (48) are used to construct the highlight and shadow tone scale segments respectively. First the variables $x_{ho}$, $x_{he}$, $x_{so}$ and $x_{se}$ are determined automatically using the cumulative histogram values derived from the pixels of the source digital image 102. Next the variables $\alpha_{h1}$, $\alpha_{h2}$, $\alpha_{s1}$, and $\alpha_{s2}$ are determined by the iterative numerical solution described above. The tone scale function 203 is constructed from the highlight and shadow tone scale segments. Next the tone scale function 203 is applied to the source digital image 102 using the spatial filtering method described above. The user of the system views the resultant rendered digital image 103 either by viewing a photographic print generated with the processed digital image or by viewing the processed digital image on an electronic display device. After having analyzed the viewed image, the user can then indicate preferences as to the lightness of the shadow regions of the viewed image and the lightness of the highlight regions of the viewed image. The user makes selections by using the mouse pointing device with options having been displayed on an electronic display device via a graphical user interface. The user input selections 231 are used by the software implementation to change a highlight control parameter $\Delta_h$ and a shadow control parameter $\Delta_s$. The highlight and shadow control parameters are then used to modify the highlight and shadow tone scale segments of the tone scale function 203.

The variables $\Delta_h$ and $\Delta_s$ are first calculated using expressions (57) and (58) respectively.

$$\Delta_h = x_w - F_H(x_w) \tag{57}$$

$$\Delta_s = x_B - F_S(x_B) \tag{58}$$

The user input selections are then used to change the values of the variables $\Delta_h$ and $\Delta_s$ resulting in variables $\Delta_h'$ and $\Delta_s'$. Next, the variable $\alpha_{h1}$ is recalculated subject to the constraint given by expression (59).

$$F_H(x_w) = x_w - \Delta_h' \tag{59}$$

Similarly, the variable $\alpha_{s1}$ is recalculated subject to the constraint given by expression (60).

$$F_S(x_S) = x_S - \Delta_s \tag{60}$$

A modified tone scale function is constructed using the recalculated highlight and shadow tone scale segments. The modified tone scale function is then re-applied to the source digital image 102 and the resultant rendered digital image 103 is displayed on the electronic display device.

In an alternative embodiment of the manual user mode of operation, the highlight and shadow tone scale segments are set to defaults such that the tone scale function 203 assumes the identity mapping one-to-one input-to-output line shape. The user views a rendered digital image 103 on the electronic display device that essentially has not been enhanced to change its tone scale characteristics. The user then makes selections, as described above, to effect a change in the shadow and highlight lightness characteristics of the viewed image.

The possible use of the present invention can be detected in another digital imaging system through the use of specialized test imagery and subsequent analysis of the processed test imagery. Test digital images are prepared by selecting digital images that are typically improved with the use of the present invention from a database of digital images. The test digital images $\{t_1, t_2, \ldots, t_n\}$ are then transmitted to the system in question, processed by the system in question, and service digital images $\{q_1, q_2, \ldots, q_n\}$ are received for analysis. The test digital images $\{t_1, t_2, \ldots, t_n\}$ are also processed using an implementation of the present invention, resulting in processed digital images $\{p_1, p_2, \ldots, p_n\}$, on a digital imaging system that is under complete control with regard to the image processing control parameters associated with the present invention. The processed digital images and the service digital images are compared on an image by image basis to produce an error metric $\{e_1, e_2, \ldots, e_n\}$, one error metric value corresponding to each digital image. The error metric values are then used to determine the likelihood that the present invention was employed by the system in question to generate the service digital images.

The first part of the detection analysis involves deriving the tone scale function that was used by the system in question individually for each test digital image. This is necessary due to the fact that the tone scale function can be derived from the test digital image and can therefore be unique for a given test digital image. Deriving a tone scale function is accomplished by an analysis technique that compares, on a pixel by pixel basis, the functional relationship between the pixels of a service digital image $q_j$ and a test digital image $p_j$. If there is a one-to-one relationship between the pixels being compared, i.e. the test digital image pixels can be used to exactly predict the pixels of the service digital image. For this condition, it is unlikely that a spatial filter was employed to apply a tone scale function in the generation of the service digital image $q_j$. The approximate tone scale function $T_j(x)$ can be calculated by using the following procedure. For each function value of $T_j(x_k)$, the pixel values in $q_j$ are averaged that correspond to pixels in $p_j$ that have a narrow range of values between $x_k-\delta$ and $x_k+\delta$. This establishes the average functional relationship between pixels in the two compared digital images. This process is repeated for all domain pixel values and thus establishes $T_j(x)$. This process is repeated for the other test digital images.

Once the approximate tone scale functions are calculated they can be compared to tone scale functions generated with the implementation of the present invention on an image by image basis. A variety of different metrics can be used to indicate the similarity between two tone scale functions. First the difference in the overall lightness balance must be accounted for. Each approximate tone scale function is analyzed to determine the input pixel value corresponding to the reference gray point. Next the approximate tone scale function, in the form of a LUT, is compared with tone scale function for the same digital image produced with the present invention on a LUT value basis with the overall difference in lightness balance accounted for. The error metric $e_j$ for the $j^{th}$ test digital image is computed by calculating an average root-sum-square (rms) of the difference between the two tone scale functions. High rms values indicate that the two tone scale functions are significantly different. For this result, it is unlikely that the present invention was used to process the test digital image. Low rms values indicate that the two tone scale functions are similar since any mis-matches in the two tone scale functions tends to produce a high rms value. The tone scale function comparison is repeated for all the test digital images. The error metric $\{e_1, e_2, \ldots, e_n\}$ is then analyzed to determine if a significant fraction of the set of test images have correspondingly low rms values. It is possible that the for some of the test digital images that the system in question may deviate from the method of the present invention for calculating the tone scale function. Therefore, it is still possible that the system in question is employing an implementation of the present invention for some of the test digital images.

It is also possible for the system in question to employ the present invention and not have a high likelihood of use indicated by the above described analysis procedure. Most systems can be operated in a variety of different modes by turning on and off different combinations of features. This can complicate the detection method. The above test can be repeated by configuring the system in question in as many modes as is practical or possible. The results can be analyzed to find if any of the configurations yield a high likelihood of use with the above described test procedure.

Similarly, the system in question may have employed the present invention but may have used different control parameter setting for the implementation. Therefore the above described tests may need to be repeated using different combinations of the parameter values described above that can affect the imaging results such as but not limited to: the $x_w$, $x_B$, $\phi_{HC}$, $\phi_{HE}$, $\phi_{SC}$, and $\phi_{SE}$ variables.

Some digital imaging systems do not allow for an option of receiving service digital images (processed digital images) and only provide for the generation of service photographic prints. For such systems in question, it is possible to scan the service photographic prints with a high quality print scanner which can generate digital images. Thus service digital images can be produced from the service photographic prints. It may be necessary to develop a scene independent tone scale function to process the scanned digital images from the print scanner to get them into a form suitable for analysis. This can be accomplished with the procedure described above using test prints that include gray scale test patches.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention.

Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image capture device
10a image capture device
10b image capture device
10c image capture device
20 digital image processor
30a image output device
30b image output device
40 general control processor
50 monitor device
60 input control device
70 computer memory device
101 original digital image
102 source digital image
103 rendered digital image
104 enhanced digital image
107 luminance digital image
109 chrominance digital image
113 enhanced luminance digital image
201 analysis digital image
203 tone scale function
210 LCC conversion module
220 RGB conversion module
230 tone scale function generator
231 user input selections
240 tone scale function applicator
250 analysis image generator Parts List cont'd
310 RLSE conversion module
320 scene balance module
330 tone scale module
340 rendering module
401 input digital image
402 texture digital image
403 pedestal digital image
407 tone scale adjusted digital image
409 output digital image
410 pedestal generation module
420 difference module
430 tone scale pedestal applicator
440 addition module
500 point
501 curve
502 curve
503 line
511 point
512 curve
513 curve
514 point
515 curve
516 curve
517 curve
518 curve
519 point
521 point
522 curve Parts List cont'd
523 curve
524 line
530 curve
531 line
532 curve
533 point
534 point
535 line
536 curve
537 curve
538 point
539 curve
540 line
541 point
542 line
543 curve
544 curve
549 point
550 curve
551 curve
552 line
553 curve
554 curve
555 curve
556 curve
557 line
558 curve
559 curve
560 line Parts List cont'd
561 point
562 domain
563 domain
564 domain
565 point
566 point
567 domain
568 domain
569 domain
570 point
571 point
573 line
574 point
575 curve
577 point
578 point
579 point
580 curve
582 domain
590 curve
591 point
592 point
593 point
595 point
596 point
597 point
598 curve Parts List cont'd
601 curve
602 curve
603 point
604 point
605 point
606 point

What is claimed is:

1. A method of producing a tone scale function which can operate on a source digital image to improve tonal characteristics, comprising the steps of:

generating the tone scale function having a highlight tone scale segment and a shadow tone scale segment defined relative to a fixed reference point on the tone scale function, and that is adapted to operate on the source digital image to improve its tonal characteristics by:
i) using a first function with a monotonically decreasing slope characteristic to produce the highlight tone scale segment that includes points that are equal to or greater than the fixed reference point; and
ii) using a second function with a monotonically increasing slope characteristic to produce the shadow tone scale segment that includes points that are equal to or less than the fixed reference point wherein the slopes of the highlight and shadow tone scale segments are unequal at the fixed reference point.

2. The method of claim 1 using the tone scale function and the source digital image to generate an enhanced digital image.

3. The method of claim 2 using a sigmoid shaped rendering function independent of the source digital image and the enhanced digital image to generate a rendered digital image.

4. The method of claim 2 further including using a spatial filter in applying the tone scale function to the source digital image.

5. The method of claim 1 wherein the source digital image includes pixels having at least three different colors.

6. The method of claim 1 wherein the pixels of the source digital image have a logarithmic relationship to original scene intensities.

7. The method of claim 1 further including combining the first function with a linear function to produce the highlight tone scale segment wherein the contribution of the linear function to the highlight tone scale segment is selected by at least one controllable parameter.

8. The method of claim 1 further including combining the second function with a linear function to produce the shadow tone scale segment wherein the contribution of the linear function to the shadow tone scale segment is selected by at least one controllable parameter.

9. The method of claim 1 further including combining the first function with a third function that has a monotonically decreasing slope characteristic to produce the highlight tone scale segment wherein the contribution of the third function to the highlight tone scale segment is selected by at least one controllable parameter.

10. The method of claim 1 further including combining the second function with a third function that has a monotonically increasing slope characteristic to produce the shadow tone scale segment wherein the contribution of the third function to the shadow tone scale segment is selected by at least one controllable parameter.

11. The method of claim 1 further including combining the first function with a third function that has a monotonically decreasing slope characteristic and a fourth linear function to produce the highlight tone scale segment wherein the contribution of the fourth linear function to the highlight tone scale segment is selected by at least one controllable parameter.

12. The method of claim 1 further including combining the second function with a third function that has a monotonically increasing slope characteristic and a fourth linear function to produce the shadow tone scale segment wherein the contribution of the fourth linear function to the shadow tone scale segment is selected by at least one controllable parameter.

13. A method of producing a tone scale function which can operate on a source digital image to improve tonal characteristics, comprising the steps of:
generating a tone scale function having a highlight tone scale segment and a shadow tone scale segment defined relative to a fixed reference point on the tone scale function, and that is adapted to operate on the source digital image to improve its tonal characteristics, wherein:
i) the highlight and shadow tone scale segments are defined by different non-linear mathematical functions; and
ii) the shape of the highlight tone scale segment is controlled independently of the shape of the shadow tone scale segment.

14. The method of claim 13 using the tone scale function and the source digital image to generate an enhanced digital image.

15. The method of claim 14 using a sigmoid shaped rendering function independent of the source digital image and the enhanced digital image to generate a rendered digital image.

16. The method of claim 13 wherein the slopes of the highlight and shadow tone scale segments are each equal at the fixed reference point.

17. The method of claim 13 wherein the slopes of the highlight and shadow tone scale segments are unequal at the fixed reference point.

18. The method of claim 13 further including the step of using the pixels of the source digital image to produce the highlight and shadow tone scale segments.

* * * * *